US012349734B2

(12) United States Patent
Fursa et al.

(10) Patent No.: US 12,349,734 B2

(45) Date of Patent: Jul. 8, 2025

(54) AEROSOL-GENERATING DEVICE FOR GENERATING AN AEROSOL BY INDUCTIVE HEATING OF AN AEROSOL-FORMING SUBSTRATE

(71) Applicant: Philip Morris Products S.A., Neuchâtel (CH)

(72) Inventors: Oleg Fursa, Gempenach (CH); Andreas Michael Rossoll, Le Mont-sur-Lausanne (CH); Enrico Stura, Palézieux-Village (CH); Stefan Weber, Regensburg (DE)

(73) Assignee: Philip Morris Products S.A., Neuchâtel (CH)

( * ) Notice: Subject to any disclaimer, the term of this patent is extended or adjusted under 35 U.S.C. 154(b) by 297 days.

(21) Appl. No.: 18/000,847

(22) PCT Filed: Jun. 10, 2021

(86) PCT No.: PCT/EP2021/065578

§ 371 (c)(1),
(2) Date: Dec. 6, 2022

(87) PCT Pub. No.: WO2021/250153

PCT Pub. Date: Dec. 16, 2021

(65) Prior Publication Data

US 2023/0210186 A1 Jul. 6, 2023

(30) Foreign Application Priority Data

Jun. 12, 2020 (EP) .................................... 20179837

(51) Int. Cl.

*A24F 40/465* (2020.01)
*A24F 40/70* (2020.01)

(Continued)

(52) U.S. Cl.

CPC ............ *A24F 40/465* (2020.01); *A24F 40/70* (2020.01); *H05B 6/105* (2013.01); *A24F 40/20* (2020.01)

(58) Field of Classification Search

None

See application file for complete search history.

(56) References Cited

U.S. PATENT DOCUMENTS

2008/0053986 A1 3/2008 Clark et al.
2016/0057900 A1 2/2016 Polak et al.

(Continued)

FOREIGN PATENT DOCUMENTS

CN 104900383 A 9/2015
CN 105529174 A 4/2016

(Continued)

OTHER PUBLICATIONS

International Search Report and Written Opinion mailed on Jul. 30, 2021 in PCT/EP2020/065578 filed on Jun. 10, 2021, 16 pages).

(Continued)

*Primary Examiner* — Cynthia Szewczyk

(74) *Attorney, Agent, or Firm* — Oblon, McClelland, Maier & Neustadt, L.L.P.

(57) ABSTRACT

An aerosol-generating device for generating an aerosol by inductive heating of an aerosol-forming substrate is provided, the device including: a device housing including a cavity to removably receive the substrate; an inductive heating arrangement including an induction coil to generate a varying magnetic field within the cavity and being arranged around at least a portion of the cavity; and a flux concentrator arranged around at least a portion of the coil and being configured to distort the field of the arrangement towards the cavity, the flux concentrator including a multi-layer flux concentrator foil having a magnetic layer lami- (Continued)

nated with at least a first support layer, the magnetic layer including a plurality of separated fragments of a soft magnetic alloy and being arranged in a pattern including a plurality of crack centers, and a plurality of cracks spread radially outwards from each crack center in a web-shaped pattern.

18 Claims, 7 Drawing Sheets

(51) Int. Cl.

| | |
|---|---|
| ***H05B 6/10*** | (2006.01) |
| *A24F 40/20* | (2020.01) |

(56) References Cited

U.S. PATENT DOCUMENTS

| | | | |
|---|---|---|---|
| 2017/0360102 | A1 | 12/2017 | Li et al. |
| 2019/0182909 | A1 | 6/2019 | Fursa et al. |

FOREIGN PATENT DOCUMENTS

| | | | |
|---|---|---|---|
| CN | 109451716 | A | 3/2019 |
| DE | 695 21 856 | T2 | 4/2002 |
| EP | 2 797 092 | A1 | 10/2014 |
| EP | 3 243 395 | A2 | 11/2017 |
| RU | 2 670 060 | C2 | 10/2018 |
| WO | WO 2008 021420 | A1 | 2/2008 |
| WO | WO 2018 041450 | A1 | 3/2018 |
| WO | WO 2020 074622 | A1 | 4/2020 |
| WO | WO 2021 083986 | A1 | 5/2021 |

OTHER PUBLICATIONS

Combined Russian Office Action and Search Report issued Oct. 29, 2024 in Russian Patent Application No. 2023100261/03 (with English Translation of Office Action), 9 pages.

AEROSOL-GENERATING DEVICE FOR GENERATING AN AEROSOL BY INDUCTIVE HEATING OF AN AEROSOL-FORMING SUBSTRATE

The present disclosure relates to an aerosol-generating device for generating an aerosol by inductively heating an aerosol-forming substrate, wherein the device comprises a flux concentrator foil. The disclosure further relates to an aerosol-generating system comprising such a device and an aerosol-generating article, wherein the article comprises the aerosol-forming substrate to be heated. Furthermore, the present disclosure relates to a method for manufacturing a multi-layer flux concentrator foil of such a device.

Aerosol-generating systems for inductive heating aerosol-forming substrates capable to form inhalable aerosols are generally known from prior art. Such systems may comprise an aerosol-generating device having a cavity for receiving the substrate to be heated. The substrate may be integral part of an aerosol-generating article that is configured for use with the device. For heating the substrate, the device may comprise an inductive heating arrangement that includes an induction coil for generating a varying magnetic field within the cavity. The field is used to induce at least one of heat generating eddy currents or hysteresis losses in a susceptor which—in use of the system—is arranged in thermal proximity or direct physical contact with the substrate in order to be heated. In general, the susceptor may be either integral part of the device or integral part of the article.

The magnetic field may not only inductively heat the susceptor, but also interfere with other susceptive parts of the aerosol-generating device or susceptive external items in close proximity to the device. In order to reduce such undesired interference, the aerosol-generating device may be provided with a flux concentrator arranged around the inductive heating arrangement which substantially acts to confine the magnetic field generated by the heating arrangement within the volume enclosed by the flux concentrator. However, it has been observed that the confining effect is often reduced or even lost when the device has suffered from excessive force impacts or shocks, for example, after the device has accidentally fallen down. In addition, many flux concentrators are rather bulky and thus may significantly increase the overall mass and size of the aerosol-generating device. Moreover, it has been observed that the flux concentrator undesirably heats up itself in use of the device, in particular when operating the device with varying magnetic fields in the Mega-Hertz range.

Therefore, it would be desirable to have an aerosol-generating device and system for inductively heating an aerosol-forming substrate with the advantages of prior art solutions, whilst mitigating their limitations. In particular, it would be desirable to have an aerosol-generating device and system comprising a flux concentrator which has an enhanced robustness and a compact design, but which heats up less in use of the device.

According to an aspect of the present invention, there is provided an aerosol-generating device for generating an aerosol by inductive heating of an aerosol-forming substrate. The device comprises a device housing comprising a cavity configured for removably receiving the aerosol-forming substrate to be heated. The device further comprises an inductive heating arrangement comprising at least one induction coil for generating a varying magnetic field within the cavity, wherein the induction coil is arranged around at least a portion of the receiving cavity. In addition, the device comprises a flux concentrator arranged around at least a portion of the induction coil and configured to distort the varying magnetic field of the at least one inductive heating arrangement towards the cavity during use of the device. The flux concentrator comprise a multi-layer flux concentrator foil having at least one magnetic layer laminated with at least a first support layer, wherein the magnetic layer comprises a plurality of separated fragments of a soft magnetic alloy.

According to the invention, it has been found that a flux concentrator which comprises or is made of a flux concentrator foil is more flexible than other flux concentrator configurations, for example ferritic solid bodies. Due to this, flux concentrator foils provide good shock absorption properties and, thus, can withstand higher excessive force impacts or shocks without breakage. For example, as compared to susceptors made from sintered ferrite powder, a flexible flux concentrator foil offers a largely improved resistance to shock loading, such as resulting from accidental drop. In addition, flux concentrator foils allow fora more compact design of the aerosol-generating device due to their small dimensions. In particular, as compared to a sintered ferrite flux concentrators, flux concentrator foils can be made significantly thinner. Furthermore, in contrast to solid body flux concentrators, flux concentrator foils also allow for compensating manufacturing tolerances as well as for fine tuning the inductance. In particular, the flux concentrator foil may advantageously help to enhance the impedance stability of the inductive coil with temperature. In general, the impedance of the induction coil is affected by the presence of the flux concentrator. When using a flux concentrator foil, the conductance of the induction heating system may change less with temperature due to the small volume of the foil, in particular in comparison to large volume solid body flux concentrators. As a consequence of this, the impedance may also change less with temperature. Also, flux concentrator foils are easy to manufacture.

Most important, as the magnetic layer comprises a plurality of separated fragments, the formation of eddy currents in the magnetic layer is partially inhibited due to each single fragment providing only limited space for eddy currents to form up. That is, as compared to a non-fragmented magnetic layer, a fragmented magnetic layer has a reduced AC resistance. As a result, there is no or only little energy dissipation in the fragments causing the flux concentrator foil as a whole to heat up only slightly, if at all. Hence, the vast majority of the energy provided by the varying magnetic field can be dissipated in the susceptor and thus effectively used to heat the aerosol-forming substrate in the cavity.

As used herein, the term "concentrate the magnetic field" means that the flux concentrator is able to distort the magnetic field so that the density of the magnetic field is increased within the cavity.

By distorting the magnetic field towards the cavity, the flux concentrator reduces the extent to which the magnetic field propagates beyond the induction coil. That is, the flux concentrator acts as a magnetic shield. This may reduce undesired heating of adjacent susceptive parts of the device, for example a metallic outer housing, or undesired heating of adjacent susceptive items external to the device. By reducing undesired heating losses, the efficiency of the aerosol-generating device may be further improved.

Furthermore, by distorting the magnetic field towards the cavity, the flux concentrator advantageously can concentrate or focus the magnetic field within the cavity. This may increase the level of heat generated in the susceptor for a given level of power passing through the induction coil in comparison to induction coils having no flux concentrator. Thus, the efficiency of the aerosol-generating device may be improved.

As used herein, the term "foil" refers to a thin sheet material having a thickness much smaller than the dimension in any direction perpendicular to the direction of the thickness. As used herein, the term "thickness" refers to the dimension of the foil perpendicular to the major surfaces of the foil. The flux concentrator foil may have a thickness in a range between 0.02 millimeter and 0.25 millimeter, in particular between 0.05 millimeter and 0.2 millimeter, preferably between 0.1 millimeter and 0.15 millimeter. For example, the flux concentrator foil may have a thickness of 62 micrometer. The flux concentrator foil may have a thickness of at most 150 micrometers, in particular at most 100 micrometers, preferably at most 80 micrometers. Such values of the thickness allow for a particularly compact design of the aerosol-generating device. Yet, these values are still large enough to sufficiently distort the alternating magnetic field of the inductive heating arrangement towards the cavity during use of the device.

The thickness of the flux concentrator may be substantially constant along any direction perpendicular to the thickness of the flux concentrator. In other examples, the thickness of the flux concentrator may vary along one or more directions perpendicular to the thickness of the flux concentrator. For example, the thickness of the flux concentrator may taper, or decrease, from one end to another end, or from a central portion of the flux concentrator towards both ends. The thickness of the flux concentrator may be substantially constant around its circumference. In other examples, the thickness of the flux concentrator may vary around its circumference.

The magnetic layer may have a layer thickness in a range between 15 micrometer and 100 micrometer, in particular between 18 micrometer and 40 micrometer, for example 20 micrometer. The magnetic layer may have a layer thickness of at most 100 micrometers, in particular at most 50 micrometers, preferably at most 40 micrometers. The magnetic layer may have a layer thickness of at most 75%, in particular 50%, more particularly of at least 40%, preferably of at least 35% thickness of flux concentrator foil.

Advantageously, the first support layer servers to bond and carry the fragments laminated with the first support layer. Preferably, the multi-layer flux concentrator foil may further comprise a second support layer on a side of the at least one magnetic layer or—as will be described further below—on a side of the plurality of adjacent magnetic layers opposite to the first support layer. Like the first support layer, the second support layer preferably is laminated with the least one magnetic layer or—if applicable—the plurality of adjacent magnetic layers. Advantageously, the second layer is also used to bond and carry the fragments.

At least of the first support layer and—if present—the second support layer substrate layer may comprise a polymeric film. The polymeric film may be selected from polyesters, polyimides, polyolefins, or combinations thereof. The substrate layer may comprise a release liner. Preferably, at least one of the first support layer and—if present—the second support layer may be one of an adhesive layer, an electrically insulating layer, or an electrically insulating adhesive layer. Using electrically insulating adhesive layer advantageously avoids short-circuiting of the fragments within the least one magnetic layer or—if applicable—the plurality of adjacent magnetic layers adjacent to the first or the second support layer, respectively.

The first support layer and—if present—the second support layer may be an edge layer of the multi-layer flux concentrator foil, that is, one of the two outer most layers of the multi-layer flux concentrator foil.

As used herein, the term "magnetic" refers to either one of ferromagnetic or ferrimagnetic. That is, the soft magnetic alloy is either ferromagnetic or ferrimagnetic.

As used herein, the term soft magnetic alloy refers to a magnetic alloy which has a low magnetic coercivity, in particular a magnetic coercivity of at most 100 Nm (Ampere/meter), preferably at most 50 Nm (Ampere/meter), more preferably at most 10 Nm (Ampere/meter), most preferably at most 5 Nm (Ampere/meter). The magnetic coercivity is a measure of the ability of a magnetic material to withstand an external magnetic field without becoming demagnetized. Due to the low magnetic coercivity, soft magnetic alloys advantageously have low hysteresis losses. Preferably, the soft magnetic alloy is brittle. This proves advantageous with regard to cracking the soft magnetic alloy into a plurality of separated fragments.

The soft magnetic alloy of the flux concentrator foil may comprise or may be made from any material or combination of materials suitable to distort the magnetic field.

Preferably, the soft magnetic alloy may be a metallic glass (amorphous metal) or a nanocrystalline soft magnetic alloy, in particular a nanocrystalline soft magnetic Fe-based alloy.

In particular, the soft magnetic alloy of the flux concentrator foil may be or may comprise a composition of $Fe_{100\text{-}a\text{-}b\text{-}c\text{-}x\text{-}y\text{-}z}Cu_aM_bT_cSi_xZ_z$ and up to 0.5 atom % contaminants, wherein M is one or more of the group consisting of Nb, Mo and Ta, T is one or more of the group consisting of V, Cr, Co and Ni, and Z is one or more of the group consisting of C, P and Ge, and wherein 0.5 atom %<a<1.5 atom %, 2 atom %≤b<4 atom %, 0 atom %≤c<5 atom %, 12 atom %<x<18 atom %, 5 atom %<y<12 atom % and 0 atom %≤z<2 atom %.

For example, the soft magnetic alloy of the flux concentrator foil may comprise or be made of an alloy available under the trademark Vitroperm® from VACUUMSCHMELZE GmbH & Co. KG, Germany. Vitroperm® alloys are nano-crystalline soft magnetic alloys. For example, flux concentrator foil may comprise or be made of Vitroperm 220, Vitroperm 250, Vitroperm 270, Vitroperm 400, Vitroperm 500 or Vitroperm 800. In particular, the soft magnetic alloy may be or may comprise a composition of $Fe_{73.8}Nb_3Cu_1Si_{15.6}B_{6.6}$. This composition corresponds to Vitroperm 800.

As used herein, the term "flux concentrator" refers to a component having a high relative magnetic permeability which acts to concentrate and guide the magnetic field or magnetic field lines generated by an induction coil. As used herein, the term "high relative magnetic permeability" refers to a relative magnetic permeability of at least 100, in particular of at least 1000, preferably of at least 10000, even more preferably of at least 50000, most preferably of at least 80000. These example values refer to the maximum values of relative magnetic permeability for frequencies up to 50 kHz and a temperature of 25 degrees Celsius. The term "relative magnetic permeability" refers to the ratio of the magnetic permeability of a material, or of a medium, such as the flux concentrator, to the magnetic permeability of free space μ_0, where μ_0 is $4\pi\cdot10^{-7}$ $N\cdot A^{-2}$ (4·Pi 10E-07 Newton per square Ampere). Accordingly, soft magnetic alloy preferably has a relative magnetic permeability of at least of at least 100, in particular of at least 1000, preferably of at least 10000, even more preferably of at least 50000, most preferably of at least 80000. These values preferably refer to maximum values of relative magnetic permeability at frequencies up to 50 kHz and a temperature of 25 degrees Celsius.

As will be described further below in more detail with regard to the method of the present invention, the fragmented magnetic layer may result from a multi-layer flux concentrator foil having at least one magnetic layer of a soft magnetic alloy laminated with at least a first support layer in which the magnetic layer is cracked into a plurality of separated fragments. Cracking of the magnetic layer may be achieved, for example, by applying an external force to the flux concentrator foil transvers to the foil plane. While the magnetic layer is cracked into a plurality of fragments, the first support layer and—if present—the second support layer remain intact and are not cracked into fragments in order to hold the fragmented magnetic layer together.

Depending on the tools and the method used for cracking the magnetic layer into fragments, the plurality of separated fragments may be arranged in a pattern comprising a plurality of crack centers, wherein a plurality of cracks spread radially outwards from each crack center in a web-shaped pattern.

Also depending on the tools and the method used, the fragments may have different kind of shapes. For example, the fragments may have a flake-like shape.

Preferably, each single fragment may have a fragment size which is at most 1 millimeter, in particular at most 750 micrometer or at most 500 micrometer. Likewise, the plurality of separated fragments may have a mean fragment size which is at most 1 millimeter, in particular at most 750 micrometer or at most 500 micrometer. Such values of the fragment size allow for an enhanced reduction of the AC resistance of the magnetic layer and, thus, for an enhanced reduction of the eddy current losses in the flux concentrator foil.

In general, the multi-layer flux concentrator foil may comprise a single (one) magnetic layer. It is also possible that the multi-layer flux concentrator foil comprises a plurality of adjacent magnetic layers. A plurality of adjacent magnetic layers may enhance the flux concentration effect. In addition, usage a foil having a plurality of adjacent magnetic layers may reduce the effort for arranging the flux concentrator foil around the induction coil as a single winding of a multi magnetic layer flux concentrator foil may achieve the same effect as a single magnetic layer flux concentrator foil arranged around the induction coil in a plurality of windings on top of each other.

With regard to a flux concentrator foil having a plurality of adjacent magnetic layers, the multi-layer flux concentrator foil may comprise an adhesive film, in particular an electrically insulating adhesive film, which is arranged between each pair of adjacent magnetic layers. Advantageously, the adhesive film serves to bond and carry the plurality of fragments of the various magnetic layers. Usage of an electrically insulating adhesive film avoids short-circuiting of the fragments within one magnetic layer or adjacent layers via the adhesive film. The adhesive film arranged between each pair of adjacent magnetic layers may also be denoted as intermediate support layer. That is, the flux concentrator foil may also comprise at least one intermediate support layer. The intermediate support layer may be arranged between a pair of adjacent magnetic layers. More details will be described further below with respect to the method according to the present invention, and equally apply to the aerosol-generating device according to the present invention as described herein.

For example, the multi-layer flux concentrator foil may comprise the following layers (from bottom to top):

- an adhesive (non-PET) first support layer,
- a first magnetic layer comprising or made of the soft magnetic alloy,
- an adhesive (non-PET) intermediate support layer,
- a second magnetic layer comprising or made of the soft magnetic alloy, and
- an adhesive (PET-based) second support layer.

As will be described in more detail below, the multi-layer flux concentrator foil may be a sealed multi-layer flux concentrator foil That is, the multi-layer flux concentrator foil may be sealed in order to prevent fragments from laterally escaping from the foil. For this, a sealing adhesive tape may be arranged on one or each side of the (unsealed) flux concentrator foil, wherein the adhesive sealing tape has a width extension in a direction transverse to opposite (cut) edges of the flux concentrator foil which is larger than a width extension of the unsealed flux concentrator foil in the same direction, that is, in a direction transverse to opposite cut edges of the (unsealed) flux concentrator foil. As a result, the sealing adhesive tape on each side of the (unsealed) flux concentrator foil comprises laterally protruding wings, which may get into adhesive contact with each other such as to seal the edges of the (unsealed) flux concentrator. As an example, the sealed multi-layer flux concentrator foil may comprise the following layers (from bottom to top):

- a first three-layer adhesive sealing laminate comprising a (PEN- or PI-based) film sandwiched between a first adhesive layer and a second adhesive layer,
- an adhesive (non-PET) first support layer,
- a first magnetic layer comprising or made of the soft magnetic alloy,
- an adhesive (non-PET) intermediate support layer,
- a second magnetic layer comprising or made of the soft magnetic alloy,
- an adhesive (PET-based) second support layer, and
- a second three-layer adhesive sealing laminate comprising a (PEN- or PI-based) film sandwiched between a first adhesive layer and a second adhesive layer.

As another example, the sealed multi-layer flux concentrator foil may comprise the following layers (from bottom to top):

- a first PET-based adhesive film,
- an adhesive (non-PET) first support layer,
- a first magnetic layer comprising or made of the soft magnetic alloy,
- an adhesive (non-PET) intermediate support layer,
- a second magnetic layer comprising or made of the soft magnetic alloy,
- an adhesive (PET-based) second support layer, and
- a second PET-based adhesive film.

The first and second three-layer adhesive sealing laminate may comprise a PEN (polyethylene terephthalate)-based film sandwiched between a first adhesive layer and a second adhesive layer. Likewise, the three-layer adhesive sealing laminate may comprise a PI (polyimide)-based film sandwiched between a first adhesive layer and a second adhesive layer. The PEN (polyethylene terephthalate)-based film may have a thickness of 2-5 micrometer, in particular 3 micrometer. Likewise, the PI (polyimide)-based film may have a thickness of 2-8 micrometer, in particular 5-7 micrometer. In total, the three-layer adhesive sealing laminate may have a thickness of 3-15 micrometer, in particular 4-13 micrometer, for example, 5 micrometer or 7 micrometer or 9 micrometer or 13 micrometer. The first and second adhesive layers of the three-layer sealing adhesive tape may comprise a non-PET (polyethylene terephthalate) based adhesive The first and second PET-based adhesive film may have a thickness of 2-5 micrometer, in particular 3 micrometer.

The adhesive (non-PET-based) first and second support layer and the adhesive (PET-based) third support layer may have a thickness in a range between 2 micrometer and 10 micrometer, in particular in range between 2 micrometer and 5 micrometer, for example, 3 micrometer.

The first and second magnetic layer may have a thickness in range between 15 micrometer and 25 micrometer, in particular in range between 18 micrometer and 23 micrometer, for example, 21 micrometer.

Further details of the various tapes, films and layer will be described further below with respect to the method according to the present invention, and equally apply to the aerosol-generating device according to the present invention as described herein.

Used herein, the term "separated fragments" refers to a configuration of the magnetic layer which comprises a plurality of fragments or a plurality of fragment clusters being not indirect contact, in particular not in electrical contact with adjacent fragments or adjacent fragment clusters such as to allow for a suppressing of eddy current effects.

Gaps between the plurality of separated fragments or fragment clusters may be at least partially filled with an electrically insulating material, such as a binder, for example a polymer, such as a silicone. In particular, gaps between the plurality of separated fragments or fragment clusters may be at least partially filled with at least one of material of the first support layer, or—if present—material of the second support layer, or—if present—material of the adhesive film between the adjacent magnetic layers, or with matrix material (binder) of the soft magnetic alloy. Filling the gaps advantageously helps to keep the plurality of fragments or fragment clusters permanently separated from each other and thus to keep eddy current effects permanently suppressed, even when the flux concentrator foil as a whole is deformed.

In addition, the aerosol-generating device may comprise a radial gap between the at least one induction coil and the flux concentrator, which flux concentrator at least partially surrounds the induction coil. Accordingly, the gap also surrounds the induction coil at least partially. The gap may have a radial extension in a range between 40 micrometers and 400 micrometers, in particular between 100 micrometers and 240 micrometers, for example 220 micrometers. Advantageously, the gap may help to reduce losses in the induction coil and to increase losses in the susceptor to be heated, that is, to increase the heating efficiency of the aerosol-generating device.

The gap may be an air gap or a gap filled at least partially with a filler material, for example, a polyimide, such as poly(4,4'-oxydiphenylene-pyromellitimide), also known as Kapton®, or any other suitable dielectric materials. In particular, a first dielectric wrapper may be arranged around at least a portion of the induction coil the between the induction coil and the flux concentrator. For example, the induction coil may be wrapped by one or more layers of Kapton tape such as to fill the radial gap between the at least one induction coil and the flux concentrator. One layer of Kapton tape may have a thickness in a range between 40 micrometers and 80 micrometers.

Furthermore, the aerosol-generating device may comprise an electrically conductive shielding wrapper which is arranged around the flux concentrator. Advantageously, the electrically conductive shielding wrapper serves to shield the environment of the device from magnetic field within the device.

In addition, the aerosol-generating device may comprise a second dielectric wrapper which is arranged around the flux concentrator, in particular—if present—around the shielding wrapper. Like the first dielectric wrapper, the second dielectric wrapper may help to reduce losses in the induction coil and to increase losses in the susceptor to be heated, that is, to increase the heating efficiency of the aerosol-generating device.

In general, the flux concentrator may have any shape, yet preferably a shape matching the shape of the at least one induction which the flux concentrator is arranged around at least partially.

For example, the flux concentrator may have a substantially cylindrical shape, in particular a sleeve shape or a tubular shape. That is, the flux concentrator may be a tubular flux concentrator or a flux concentrator sleeve or a cylindrical flux concentrator. Such shapes are particularly suitable in case the at least one induction coil is a helical induction coil having a substantially cylindrical shape. In such configurations, the flux concentrator completely circumscribes the at least one induction coil along at least a part of the axial length extension of the coil. A tubular shape or sleeve shape proves particularly advantageous with regard to a cylindrical shape of the cavity as well as with regard to a cylindrical and/or helical configuration of the induction coil. As to this shapes, the flux concentrator may have any suitable cross-section. For example, the flux concentrator may have a square, oval, rectangular, triangular, pentagonal, hexagonal, or similar cross-sectional shape. Preferably, the flux concentrator has a circular cross-section. For example, the flux concentrator may have a circular, cylindrical shape.

It is also possible that the flux concentrator only extends around a part of the circumference of the at least one induction coil.

In any of these configurations, the flux concentrator is preferably arranged coaxially with a center line of the at least one induction coil. Even more preferably, the flux concentrator and the at least one induction coil are coaxially with a center line of the cavity.

In general, the inductive heating arrangement may comprise a single induction coil or a plurality of induction coils, in particular two induction coils. In case of single induction coil, the flux concentrator may be arranged around at least a portion of the single induction coil, preferably entirely around the induction coil. In case of a plurality of induction coils, the flux concentrator may be arranged around at least a portion of one of the induction coils, preferably around at least a portion of each one of the inductions coils, even more preferably entirely around each induction coil.

The flux concentrator foil may be wound up, in particular with ends overlapping each other or abutting against each other, such as to form a tubular flux concentrator or a flux concentrator sleeve. The ends overlapping each other or abutting each other may be attached to each other. Likewise, the ends overlapping each other or abutting against each other may loosely overlap each other or may loosely abut against each other.

In particular, the flux concentrator foil may be wound up in a single winding such as to form a tubular flux concentrator or a flux concentrator sleeve comprising a single winding of a flux concentrator foil. Alternatively, the flux concentrator foil may be wound up in multiple turns/windings such as to form a tubular flux concentrator or a flux concentrator sleeve comprising multiple, in particular spiral windings of the flux concentrator foil.

The flux concentrator foil may also be wound up helically in an axially direction with respect to winding axis such as to form a tubular flux concentrator or a flux concentrator sleeve comprising one or more helical windings of the flux concentrator foil overlapping each other.

It is also possible that the flux concentrator foil is wound up in separate concentric windings on top of each other. That is, the flux concentrator may comprise a plurality of flux concentrator foils wound up in separate concentric single (turn) windings on top of each other. Likewise, it is also possible that the flux concentrator foil is wound up in separate multiple spiral or multiple windings on top of each other. That is, the flux concentrator may comprise a plurality of flux concentrator foils wound up in separate concentric multiple spiral or helical (turn) windings on top of each other.

Furthermore, it possible that the flux concentrator comprises a plurality of flux concentrator foils arranged side by side next to each other, wherein each flux concentrator foil is wound up in a single winding or in multiple spiral windings overlapping each other or in separate concentric windings on top of each other.

A configuration comprising multiple, in particular multiple spiral or multiple helical windings or multiple separate concentric windings on top of each other of a flux concentrator foils may advantageously be used to generate a multi-layer flux concentrator foil or multi-layer flux concentrator, wherein each winding corresponds to one layer. For example, the flux concentrator may comprise two, or three or four or five or six or more than six multiple spiral or multiple helical windings or multiple separate concentric windings. Accordingly, such a multi-layer flux concentrator foil or multi-layer flux concentrator may have a thickness which substantially corresponds to the thickness of single layer or foil times the number of windings or layers. For example, where the foil has a thickness in a range between 0.02 mm (millimeters) and 0.25 mm (millimeters), in particular between 0.05 mm (millimeters) and 0.2 mm (millimeters), preferably between 0.1 mm (millimeters) and 0.15 mm (millimeters), a multi-layer flux concentrator foil or a multi-layer flux concentrator comprising six layers may have thickness in a range between 0.12 mm (millimeters) and 1.5 mm (millimeters), in particular between 0.3 mm (millimeters) and 1.2 mm (millimeters), preferably between 0.6 mm (millimeters) and 0.9 mm (millimeters).

In case the flux concentrator foil is wound up, in particular in a single winding, such as to form a tubular flux concentrator or a flux concentrator sleeve, the flux concentrator foil may be attached to an inner surface of the device housing in a force-fitting manner due a partial release of an elastic restoring force of the wound-up flux concentrator foil. That is, the elastic restoring force presses the flux concentrator foil radially outwards against the inner surface of the device housing. In this configuration, the ends of the wound-up foil preferably loosely overlap each other or loosely abut against each other. Advantageously, this configuration allows for a simple mounting of the flux concentrator, in particular without any additional fixing means.

It is also possible that the flux concentrator results from extruding a flux concentrator foil directly into the final shape of the flux concentrator. In particular, the flux concentrator may comprise or may be an extruded flux concentrator foil, for example, an extruded tubular flux concentrator foil or an extruded flux concentrator foil sleeve or an extruded cylindrical flux concentrator foil. The extruded tubular flux concentrator foil or the extruded flux concentrator foil sleeve or the extruded cylindrical flux concentrator foil may have a wall thickness in a range between 0.05 mm (millimeters) and 0.25 mm (millimeters), preferably between 0.1 mm (millimeters) and 0.15 mm (millimeters). The wall thickness may also be in a range between 0.12 mm (millimeters) and 1.5 mm (millimeters), in particular between 0.3 mm (millimeters) and 1.2 mm (millimeters), preferably between 0.6 mm (millimeters) and 0.9 mm (millimeters).

The inductive heating arrangement may comprise at least one susceptor element which is part of the device. Likewise, it is also possible that the at least one susceptor element is integral part of an aerosol-generating article which comprises the aerosol-forming substrate to be heated. As part of the device, the at least one susceptor element is arranged or arrangeable at least partially within the cavity such as to be in thermal proximity to or thermal contact, preferably physical contact with the aerosol-forming substrate during use.

As used herein, the term “susceptor element” refers to an element that is capable to convert electromagnetic energy into heat when subjected to a varying magnetic field. This may be the result of at least one of hysteresis losses or eddy currents which are induced in the susceptor, depending on the electrical and magnetic properties of the susceptor material. Hysteresis losses occur in ferromagnetic or ferrimagnetic susceptors due to magnetic domains within the susceptor material being switched under the influence of a varying magnetic field. Eddy currents may be induced if the susceptor is electrically conductive. In case of an electrically conductive ferromagnetic or ferrimagnetic susceptor, heat can be generated due to both, eddy currents and hysteresis losses.

Accordingly, the susceptor element may be formed from any material that can be inductively heated to a temperature sufficient to generate an aerosol from the aerosol-forming substrate. Preferred susceptor elements comprise a metal or carbon. A preferred susceptor element may comprise a ferromagnetic material, for example ferritic iron, or a ferromagnetic steel or stainless steel. A suitable susceptor element may be, or comprise, aluminum. Preferred susceptor elements may be formed from 400 series stainless steels, for example grade 410, or grade 420, or grade 430 stainless steel.

The susceptor element may comprise a variety of geometrical configurations. The susceptor element may comprise or may be a susceptor pin, a susceptor rod, a susceptor blade, a susceptor strip or a susceptor plate. Where the susceptor element is part of the aerosol-generating device, the susceptor pin, the susceptor rod, the susceptor blade, the susceptor strip or the susceptor plate may protrude into the cavity of the device, preferably towards an opening of the cavity for inserting an aerosol-generating article into the cavity.

The susceptor element also may comprise or may be a filament susceptor, a mesh susceptor, a wick susceptor. Likewise, the susceptor element may comprise or may be susceptor sleeve, a susceptor cup, a cylindrical susceptor or a tubular susceptor. Preferably, the inner void of the susceptor sleeve, the susceptor cup, the cylindrical susceptor or the tubular susceptor is configured to removably receive at least a portion of the aerosol-forming substrate or the aerosol-generating article including the aerosol-forming substrate to be heated.

The aforementioned susceptor elements may have any cross-sectional shape, for example, circular, oval, square, rectangular, triangular or any other suitable shape.

As used herein, the term "aerosol-generating device" generally refers to an electrically operated device that is capable of interacting with at least one aerosol-forming substrate, in particular with an aerosol-forming substrate provided within an aerosol-generating article, such as to generate an aerosol by heating the substrate. Preferably, the aerosol-generating device is a puffing device for generating an aerosol that is directly inhalable by a user thorough the user's mouth. In particular, the aerosol-generating device is a hand-held aerosol-generating device.

In addition to the induction coil, the inductive heating arrangement may comprise an alternating current (AC) generator. The AC generator may be powered by a power supply of the aerosol-generating device. The AC generator is operatively coupled to the at least one induction coil. In particular, the at least one induction coil may be integral part of the AC generator. The AC generator is configured to generate a high frequency oscillating current to be passed through the induction coil for generating a varying magnetic field. The AC current may be supplied to the induction coil continuously following activation of the system or may be supplied intermittently, such as on a puff by puff basis.

Preferably, the inductive heating arrangement comprises a DC/AC converter connected to the DC power supply including an LC network, wherein the LC network comprises a series connection of a capacitor and the induction coil.

The inductive heating arrangement preferably is configured to generate a high-frequency varying magnetic field. As referred to herein, the high-frequency varying magnetic field may be in the range between 500 kHz (kilo-Hertz) to 30 MHz (Mega-Hertz), in particular between 5 MHz (Mega-Hertz) to 15 MHz (Mega-Hertz), preferably between 5 MHz (Mega-Hertz) and 10 MHz (Mega-Hertz).

The aerosol-generating device may further comprise a controller configured to control operation of the device. In particular, the controller may be configured to control operation of the inductive heating arrangement, preferably in a closed-loop configuration, for controlling heating of the aerosol-forming substrate to a pre-determined operating temperature. The operating temperature used for heating the aerosol-forming substrate may be at least 180 degree Celsius, in particular at least 300 degree Celsius, preferably at least 350 degree Celsius, more preferably at least 370 degree Celsius, most preferably at least 400 degree Celsius. These temperatures are typical operating temperatures for heating but not combusting the aerosol-forming substrate. Preferably, the operating temperature is in a range between 180 degree Celsius and 370 degree Celsius, in particular between 180 degree Celsius and 240 degree Celsius or between 280 degree Celsius and 370 degree Celsius. In general, the operating temperature may depend on at least one of the type of the aerosol-forming substrate to be heated, the configuration of the susceptor and the arrangement of the susceptor relative to the aerosol-forming substrate in use of the system. For example, in case the susceptor is configured and arranged such as to surround the aerosol-forming substrate in use of the system, the operating temperature may be in a range between 180 degree Celsius and 240 degree Celsius. Likewise, in case the susceptor is configured such as to be arranged within the aerosol-forming substrate in use of the system, the operating temperature may be in a range between 280 degree Celsius and 370 degree Celsius. The operating temperature as described above preferably refers to the temperature of the susceptor in use.

The controller may comprise a microprocessor, for example a programmable microprocessor, a microcontroller, or an application specific integrated chip (ASIC) or other electronic circuitry capable of providing control. The controller may comprise further electronic components, such as at least one DC/AC inverter and/or power amplifiers, for example a Class-C, a Class-D or a Class-E power amplifier. In particular, the inductive heating arrangement may be part of the controller.

The aerosol-generating device may comprise a power supply, in particular a DC power supply configured to provide a DC supply voltage and a DC supply current to the inductive heating arrangement. Preferably, the power supply is a battery such as a lithium iron phosphate battery. As an alternative, the power supply may be another form of charge storage device such as a capacitor. The power supply may require recharging, that is, the power supply may be rechargeable. The power supply may have a capacity that allows for the storage of enough energy for one or more user experiences. For example, the power supply may have sufficient capacity to allow for the continuous generation of aerosol for a period of around six minutes or for a period that is a multiple of six minutes. In another example, the power supply may have sufficient capacity to allow for a predetermined number of puffs or discrete activations of the inductive heating arrangement.

The aerosol-generating device may comprise a main body which preferably includes at least one of the inductive heating arrangement, in particular the at least one induction coil, the flux concentrator, the controller, the power supply and at least a portion of the cavity.

In addition to the main body, the aerosol-generating device may further comprise a mouthpiece, in particular in case the aerosol-generating article to be used with the device does not comprise a mouthpiece. The mouthpiece may be mounted to the main body of the device. The mouthpiece may be configured to close the receiving cavity upon mounting the mouthpiece to the main body. For attaching the mouthpiece to the main body, a proximal end portion of the main body may comprise a magnetic or mechanical mount, for example, a bayonet mount or a snap-fit mount, which engages with a corresponding counterpart at a distal end portion of the mouthpiece. In case the device does not comprise a mouthpiece, an aerosol-generating article to be used with the aerosol-generating device may comprise a mouthpiece, for example a filter plug.

The aerosol-generating device may comprise at least one air outlet, for example, an air outlet in the mouthpiece (if present).

Preferably, the aerosol-generating device comprises an air path extending from the at least one air inlet through the receiving cavity, and possibly further to an air outlet in the mouthpiece, if present. Preferably, the aerosol-generating device comprises at least one air inlet in fluid communication with the receiving cavity. Accordingly, the aerosol-generating system may comprise an air path extending from the at least one air inlet into the receiving cavity, and possibly further through the aerosol-forming substrate within the article and a mouthpiece into a user's mouth.

The at least one induction coil and the flux concentrator may be part of an induction module that is arranged within the device housing and which forms or is circumferentially arranged, in particular removably arranged around at least a portion of the cavity of the device.

As to this, the present invention also provides an induction module arrangeable within an aerosol-generating device such as to form or being circumferentially arranged around at least a portion of a cavity of the device, wherein the cavity is configured for removably receiving an aerosol-forming substrate to be inductively heated. The induction module comprises at least one induction coil for generating a varying magnetic field within the cavity in use, wherein the at least one induction coil is arranged around at least a portion of the receiving cavity when the induction module is arranged in the device. The induction module further comprises a flux concentrator circumferentially arranged around at least a portion of the at least one induction coil and configured to distort the varying magnetic field of the induction coil during use towards the cavity, when the induction module is arranged in the device. The flux concentrator comprises or is made of a flux concentrator foil according to the present invention and as described herein. That is, the flux concentrator foil is a multi-layer flux concentrator foil having at least one magnetic layer laminated with at least a first support layer, wherein the magnetic layer comprises a plurality of separated fragments of a soft magnetic alloy Further features and advantages of the induction module, in particular of the induction coil and the flux concentrator, have been described with regard to the aerosol-generating device and equally apply.

According to another aspect of the invention there is also provided an aerosol-generating system which comprises an aerosol-generating device according to the invention and as described herein. The system further comprises an aerosol-generating article for use with the device, wherein the article comprises an aerosol-forming substrate to be inductively heated by the device. The aerosol-generating article is received or receivable at least partially in the cavity of the device.

As used herein, the term "aerosol-generating system" refers to the combination of an aerosol-generating article as further described herein with an aerosol-generating device according to the invention and as described herein. In the system, the article and the device cooperate to generate a respirable aerosol.

As used herein, the term "aerosol-generating article" refers to an article comprising at least one aerosol-forming substrate that, when heated, releases volatile compounds that can form an aerosol. Preferably, the aerosol-generating article is a heated aerosol-generating article. That is, an aerosol-generating article which comprises at least one aerosol-forming substrate that is intended to be heated rather than combusted in order to release volatile compounds that can form an aerosol. The aerosol-generating article may be a consumable, in particular a consumable to be discarded after a single use. For example, the article may be a cartridge including a liquid aerosol-forming substrate to be heated. Alternatively, the article may be a rod-shaped article, in particular a tobacco article, resembling conventional cigarettes.

As used herein, the term "aerosol-forming substrate" denotes a substrate formed from or comprising an aerosol-forming material that is capable of releasing volatile compounds upon heating for generating an aerosol. The aerosol-forming substrate is intended to be heated rather than combusted in order to release the aerosol-forming volatile compounds. The aerosol-forming substrate may be a solid aerosol-forming substrate, a liquid aerosol-forming substrate, a gel-like aerosol-forming substrate, or any combination thereof. The aerosol-forming substrate may comprise a tobacco-containing material containing volatile tobacco flavor compounds, which are released from the substrate upon heating. Alternatively or additionally, the aerosol-forming substrate may comprise a non-tobacco material. The aerosol-forming substrate may further comprise an aerosol former. Examples of suitable aerosol formers are glycerin and propylene glycol. The aerosol-forming substrate may also comprise other additives and ingredients, such as nicotine or flavourants. The aerosol-forming substrate may also be a paste-like material, a sachet of porous material comprising aerosol-forming substrate, or, for example, loose tobacco mixed with a gelling agent or sticky agent, which could include a common aerosol former such as glycerin, and which is compressed or molded into a plug.

As mentioned before, the at least one susceptor element used for inductively heating the aerosol-forming substrate may be integral part of the aerosol-generating article, instead of being of part of the aerosol-generating device. Accordingly, the aerosol-generating article may comprise at least one susceptor element positioned in thermal proximity to or thermal contact with the aerosol-forming substrate such that in use the susceptor element is inductively heatable by the inductive heating arrangement when the article is received in the cavity of the device.

Further features and advantages of the aerosol-generating system according to the invention have been described with regard to the aerosol-generating device and equally apply.

According to another aspect of the invention there is also provided a method for manufacturing a multi-layer flux concentrator foil of an aerosol-generating device according to the invention and as described herein. The method comprises:

- providing a multi-layer flux concentrator foil having at least one magnetic layer of a soft magnetic alloy laminated with at least a first support layer;
- cracking the at least one magnetic layer into a plurality of fragments by applying an external force to the flux concentrator foil transvers to the foil plane; and
- stretching the flux concentrator foil by pulling the flux concentrator foil under a tensile force parallel to the foil plane.

In particular, stretching the flux concentrator foil by pulling may comprise pulling the flux concentrator foil under a tensile force parallel to the foil plane over at least one edge, in particular over one edge only.

According to the invention it has been found that the magnetic layer of the flux concentrator foil may be reliably fragmented into a plurality of separated fragments by first applying an external force to the flux concentrator foil transvers to the foil plane and subsequently stretching the flux concentrator foil by pulling the flux concentrator foil under a tensile force parallel to the foil plane, in particular over at least one edge. While the first step leads to a cracking of the magnetic layer into a plurality of fragments, the second step causes the fragments to be cracked in even smaller fragments and—most importantly—to be pulled apart such as to be separated from each other. Advantageously, the second step results in an enhanced reduction of the AC resistance of the magnetic layer and, thus, in an enhanced reduction of the eddy current losses in the magnetic layer of the flux concentrator foil due to the fragments being pulled apart.

Cracking the at least one magnetic layer into a plurality of separated fragments may comprise passing the flux concentrator foil through at least one pair of rollers, in particular counter-rotating rollers, which apply a pressure force onto the flux concentrator foil passing therethrough. That is, pressure is applied to press the rollers against each other such that the foil passing therethrough is squeezed between the two rollers. At least one of the rollers may comprise a plurality of protrusions on its outer surface each of which locally applies a force to the flux concentrator foil transvers to the foil plane. The respective other roller may act as a counter roller. Cracking may be enhanced in case each of the rollers comprises a plurality of protrusions on its outer surface. The plurality of protrusions on both rollers may be formed as complementary protrusions. For example, in operation, the protrusions of one roller may fit in between the protrusions of the respective other roller. It is also possible that only one of the rollers comprises a plurality of protrusions, whereas the respective other roller comprises a smooth outer surface. The roller(s) having a plurality of protrusions may be made of metal, for example, stainless steel. The roller having a smooth outer surface may be made of rubber. The rubber material should have a suitable hardness to enable cracking. The flux concentrator foil may be passed either through one pair of rollers or a sequence of pairs of rollers. For cracking the at least one magnetic layer into a plurality of separated fragments, a breaking pressure in a range between 4 bar and 8 bar, for example 6 bar, may be applied onto the flux concentrator foil transvers to the foil plane, in particular via the rollers. Before and after passing through the at least one pair of rollers, the flux concentrator foil may be unwound and re-wound, respectively. Unwinding and re-winding the flux concentrator foil prior to and after it passing through the at least one pair of rollers may occur with a tensile force of 40-60 N (Newton), for example, 50 N (Newton) and a winding speed of 5 to 10 m/min, for example, 7 m/min.

The step of cracking the at least one magnetic layer into a plurality of fragments by applying an external force to the flux concentrator foil transvers to the foil plane may be repeated several times, for example one times or two times. Accordingly, the flux concentrator foil may be passed through the at least one pair of rollers two times or three times. It is also possible that the flux concentrator foil is passed through the at least one pair of rollers only once.

Pulling the flux concentrator foil over the at least one edge may include pulling the flux concentrator foil over at least one edge forth and back, in particular repeatedly forth and back, for example, 4 to 6 times forth and back. Pulling forth and back may enhance pulling the fragments apart.

Preferably, the least one edge is sharp edge. That is, the at least one edge may comprise a rounding radius of at most 1 millimeter, in particular most 0.3 millimeter, preferably at most 0.2 millimeter, more preferably at most 0.15 millimeter.

Pulling over the edge may occur under an angle in a range between 60 degrees and 120 degrees, in particular between 80 degrees and 100 degrees, preferably 90 degrees. That is, the flux concentrator foil is bended by that angle when being pulling over the edge. The angle is measured between that that a portion of the foil upstream the edge and a portion of the foil downstream the edge.

During pulling the flux concentrator foil, the tensile force may be in a range between 20 N (Newton) and 60 N (Newton), in particular between 25 N (Newton) and 40 N (Newton), for example 30 N (Newton). These values have proven to be particularly beneficial for pulling the fragments apart. Pulling the flux concentrator foil over the edge may occur with a speed of 5 to 15 m/min, for example, 10 m/min.

The step of providing a multi-layer flux concentrator foil having at least one magnetic layer of a soft magnetic alloy laminated with at least a first support layer may comprise at least one of the following:

- providing a ribbon comprising or made of the soft magnetic alloy;
- annealing the ribbon comprising or made of the soft magnetic alloy;
- providing a first adhesive tape comprising the first support layer, wherein the first support layer is adhesive;
- laminating the first support layer and the (annealed) ribbon comprising or made of the soft magnetic alloy together, such as to result in a first laminate arrangement;

The step of providing a multi-layer flux concentrator foil may further comprise at least one of the following:

- repeating the aforementioned steps of providing a ribbon, annealing the ribbon, providing an (intermediate) adhesive tape comprising an (intermediate) support layer being adhesive, and laminating the (intermediate) support layer and the (annealed) ribbon such as to result in an intermediate laminate arrangement which comprises the (intermediate) adhesive tape comprising the intermediate support layer;
- providing a second adhesive tape comprising a second support layer, wherein the second support layer is adhesive;
- laminating the first laminate arrangement, the intermediate laminate arrangement and the second adhesive tape, such as to result in a (non-sealed) multi-layer flux concentrator foil, wherein the intermediate laminate arrangement is sandwiched between the first laminate arrangement second adhesive tape.

The ribbon comprising or made of the soft magnetic alloy may have a thickness in range between 15 micrometer and 25 micrometer, in particular in range between 18 micrometer and 23 micrometer, for example, 21 micrometer. Preferably, the ribbon comprising or made of the soft magnetic alloy is provided on a roll or bobbin. Prior to annealing the ribbon comprising or made of the soft magnetic alloy, the ribbon may be re-wound one or more times, for example from one to another bobbin or roll support, to adjust the tension of the ribbon. For example, the ribbon comprising or made of the soft magnetic alloy may be re-wound in a first step with a tensile force of 20 N (Newton)±10%, and in a second step with a tensile force of 10 N (Newton)±10%. The winding speed may be 30 m/min±10% during the first step, and 20 m/min±10% during the first step.

The step of annealing the ribbon comprising or made of the soft magnetic alloy may comprise heating the ribbon comprising or made of the soft magnetic alloy at a temperature in range between 450 degree Celsius and 520 degree Celsius, for example 495 degree Celsius, for a time period in range between 300 min and 500 min, for example 450 min.

The first support layer of the first adhesive tape and the intermediate support layer of the intermediate adhesive tape may comprise an adhesive, in particular a non-PET (polyethylene terephthalate) based adhesive. The first support layer and the intermediate support layer may have a thickness in a range between 2 micrometer and 10 micrometer, in particular in range between 2 micrometer and 5 micrometer, for example, 3 micrometer. In addition to the first/intermediate support layer, the first/intermediate adhesive tape may comprise a first and a second release film on both sides of the adhesive first/intermediate support layer prior to mounting the first/intermediate adhesive tape to the (annealed) ribbon. That is, the first and/or the second release film are to be removed before attaching the adhesive first/intermediate support layer to any other object. Accordingly, the step of laminating the first/intermediate support layer to the ribbon comprising or made of the soft magnetic alloy may comprise removing the first release film from the first/intermediate adhesive tape, mounting the (annealed) ribbon to the adhesive first/intermediate support layer on a side opposite to the second release film, and preferably re-mounting the first release film on top of the (annealed) ribbon comprising or made of the soft magnetic alloy. The aforementioned steps may be realized by unwinding the first/intermediate adhesive tape and the (annealed) ribbon, removing the first release film, bringing in contact with each other and attaching together the unwound (annealed) ribbon and the unwound adhesive first/intermediate tape (without the first release film), re-mounting the first release film, applying a pressure to the resulting first/intermediate laminate arrangement and optionally re-winding the first/intermediate laminate arrangement. Unwinding the first/intermediate adhesive tape and the (annealed) ribbon may occur with a tensile force of 40-60 N (Newton), for example, 50 N (Newton) and a winding speed of 5 to 10 m/min, for example, 7 m/min. Likewise, re-winding the first/intermediate laminate arrangement may occur with a tensile force of 40-60 N (Newton), for example, 50 N (Newton) and a winding speed of 5 to 10 m/min, for example, 7 m/min.

Likewise, the second support layer of the second adhesive tape may comprise a PET (polyethylene terephthalate) based adhesive. The second support layer may have a thickness in a range between 2 micrometer and 10 micrometer, in particular in range between 2 micrometer and 5 micrometer, for example, 3 micrometer. In addition to the second support layer, the second adhesive tape may comprise a first and a second release film on both sides of the adhesive second support layer prior to mounting the second adhesive tape to the intermediate laminate arrangement. That is, the first and/or the second release film are to be removed before attaching the adhesive second support layer to any other object. Accordingly, the step of laminating the second support layer to the intermediate laminate arrangement may comprise removing the second release film from the second adhesive tape, mounting the adhesive second support layer to the intermediate laminate arrangement on a side opposite to the second release film. The aforementioned steps may be realized by unwinding the second adhesive tape, the first laminate arrangement and the intermediate laminate arrangement, removing the second release film from the second adhesive tape, removing the first and second release film from the intermediate laminate arrangement and removing the first release film from the first laminate arrangement, bringing in contact with each other and attaching together the unwound first laminate arrangement (without the first release film), the intermediate laminate arrangement (without the first and second release film) and the second adhesive tape (without the second release film), applying a pressure to the resulting (non-sealed) multi-layer flux concentrator foil and subsequently re-winding the multi-layer flux concentrator foil. Unwinding the second adhesive tape, the first laminate arrangement and the intermediate laminate arrangement may occur with a tensile force of 40-60 N (Newton), for example, 50 N (Newton) and a winding speed of 5 to 10 m/min, for example, 7 m/min. Likewise, re-winding the multi-layer flux concentrator foil may occur with a tensile force of 40-60 N (Newton), for example, 50 N (Newton) and a winding speed of 5 to 10 m/min, for example, 7 m/min.

The aforementioned process may result in a (non-sealed) multi-layer flux concentrator foil comprising the following layers (from bottom to top):

- an adhesive (non-PET) first support layer (originating from the first laminate arrangement),
- a first magnetic layer of the (annealed) ribbon comprising or made of the soft magnetic alloy (originating from the first laminate arrangement),
- an adhesive (non-PET) intermediate support layer (originating from the intermediate laminate arrangement),
- a second magnetic layer of the (annealed) ribbon comprising or made of the soft magnetic alloy (originating from the second laminate arrangement), and
- an adhesive (PET-based) second support layer (originating from the second adhesive tape).

In addition, the multi-layer flux concentrator foil may comprise a first release film on top of the adhesive second support layer (originating from the second adhesive tape), and a second release film below the adhesive first support layer (originating from the first adhesive tape of the first laminate arrangement). The first release film (originating from the second adhesive tape) and the second release film (originating from the first adhesive tape of the first laminate arrangement) are removed prior to arranging the multi-layer flux concentrator foil around at least a portion of the induction coil of the aerosol-generating device, the multi-layer flux concentrator foil is to be used in. Likewise, the first release film (originating from the second adhesive tape) and the second release film (originating from the first adhesive tape of the first laminate arrangement) may be removed prior to a possible further step of the method described herein, in particular prior to sealing one or more cut edges of the (non-sealed) flux concentrator, more particularly prior to attaching an adhesive sealing tape on one or each side of the (non-sealed) flux concentrator foil.

In addition, the method may comprise pulling the flux concentrator foil under a tensile force parallel to the foil plane over at least one roller, in particular a sequence of rollers, for bending the flux concentrator foil. Advantageously, this step may cause the fragments to be cracked in even smaller fragments, thus resulting in an enhanced reduction of the AC resistance of the magnetic layer. Pulling the flux concentrator foil over the at least one roller may be performed prior to pulling the flux concentrator foil over the at least one edge.

The at least one roller may have a radius of at most 50 millimeter, in particular at most 30 millimeter, preferably, at most 10 millimeter.

The tensile force for pulling the flux concentrator foil over the at least one roller may be in a range between 20 N (Newton) and 60 N (Newton), in particular between 25 N (Newton) and 40 N (Newton), for example 30 N (Newton).

The method may further comprise cutting the flux concentrator foil to a pre-determined size. Cutting may occur prior to cracking the magnetic layer into a plurality of fragments, or prior to pulling the flux concentrator foil over the at least one edge or after pulling the flux concentrator foil over the at least one edge.

The method may further comprise sealing one or more cut edges of the flux concentrator foil cut to size. Advantageously, this prevents fragments from laterally escaping from the foil.

Sealing one or more cut edges of the (non-sealed) multi-layer flux concentrator foil cut to size may comprise attaching a sealing adhesive tape on one or each side of the flux concentrator foil cut to size, wherein the adhesive sealing tape has a width extension in a direction transverse to opposite cut edges of the flux concentrator foil larger than a width extension of the flux concentrator foil cut to size in the same direction, that is, in a direction transverse to opposite cut edges of the flux concentrator foil. As a result, the sealing adhesive tape on each side of the (unsealed) flux concentrator foil comprises laterally protruding wings, which may get into adhesive contact with each other such as to seal the cut edges of the (unsealed) flux concentrator.

The adhesive sealing tape may comprise a three-layer adhesive sealing laminate comprising a PEN (polyethylene terephthalate)-based film sandwiched between a first adhesive layer and a second adhesive layer. Likewise, the adhesive sealing tape may comprise a three-layer adhesive sealing laminate comprising a PI (polyimide)-based film sandwiched between a first adhesive layer and a second adhesive layer. The PEN (polyethylene terephthalate)-based film may have a thickness of 2-5 micrometer, in particular 3 micrometer. Likewise, the PI (polyimide)-based film may have a thickness of 2-8 micrometer, in particular 5-7 micrometer. In total, the three-layer adhesive sealing laminate may have a thickness of 3-15 micrometer, in particular 4-13 micrometer, for example, 5 micrometer or 7 micrometer or 9 micrometer or 13 micrometer. The first and second adhesive layers of the three-layer sealing adhesive tape may comprise a non-PET (polyethylene terephthalate) based adhesive. In addition to the three-layer adhesive sealing laminate, the adhesive sealing tape may comprise a first release film on the first adhesive layer (opposite to the PEN- or PI-base film) and second release film on the second adhesive layer (opposite to the PEN- or PI-base film), wherein one of the first and the second release film is to be removed prior to attaching the sealing adhesive tape to the flux concentrator foil cut to size and wherein the respective other one of the first and the second release film is to be removed prior to arranging the sealed multi-layer flux concentrator foil around at least a portion of the induction coil of the aerosol-generating device, the multi-layer flux concentrator foil is to be used in.

Likewise, the adhesive sealing tape may comprise a PET (polyethylene terephthalate)-based adhesive film. The PET (polyethylene terephthalate)-based adhesive film may have a thickness of 2-5 micrometer, in particular 3 micrometer. In addition to the PET-based adhesive film, the adhesive sealing tape may comprise a first release film and second release film sandwiching the PET (polyethylene terephthalate)-based adhesive film, wherein one of the first and the second release film is to be removed prior to attaching the sealing adhesive tape to the flux concentrator foil cut to size and wherein the respective other one of the first and the second release film is to be removed prior to arranging the sealed multi-layer flux concentrator foil around at least a portion of the induction coil of the aerosol-generating device, the multi-layer flux concentrator foil is to be used in.

Accordingly, the step of attaching the sealing adhesive tapes to the multi-layer flux concentrator foil cut to size may comprise removing one of the first and the second release film from each of the two (sealing adhesive tapes and mounting the sealing adhesive tapes to the multi-layer flux concentrator foil, one at each side of the multi-layer flux concentrator foil. The aforementioned steps may be realized by unwinding two sealing adhesive tapes, removing the one of the first and the second release film from the sealing adhesive tape, —if applicable—removing the first release film (originating from the second adhesive tape) and the second release film (originating from the first adhesive tape of the first laminate arrangement) from the multi-layer flux concentrator foil, bringing in contact with each other and attaching together the multi-layer flux concentrator foil (without the first and second release film) and the unwound sealing adhesive tapes (without one of the first and second release film)—one sealing adhesive tape at each side of the multi-layer flux concentrator foil—such that the laterally protruding wings of the sealing adhesive tapes get into adhesive contact with each other, applying a pressure to the resulting sealed multi-layer flux concentrator foil, and optionally re-winding the sealed multi-layer flux concentrator foil.

The aforementioned process may result in a sealed multi-layer flux concentrator foil comprising the following layers (from bottom to top):

- a first three-layer adhesive sealing laminate comprising a (PEN- or PI-based) film sandwiched between a first adhesive layer and a second adhesive layer,
- an adhesive (non-PET-based) first support layer (originating from the first laminate arrangement),
- a first magnetic layer of the (annealed) ribbon comprising or made of the soft magnetic alloy (originating from the first laminate arrangement),
- an adhesive (non-PET-based) intermediate support layer (originating from the second laminate arrangement),
- a second magnetic layer of the (annealed) ribbon comprising or made of the soft magnetic alloy (originating from the second laminate arrangement),
- an adhesive (PET-based) second support layer (originating from the third adhesive tape), and
- a second three-layer adhesive sealing laminate comprising a (PEN- or PI-based) film sandwiched between a first adhesive layer and a second adhesive layer.

Likewise, the aforementioned process may result in a sealed multi-layer flux concentrator foil comprising the following layers (from bottom to top):

- a first PET-based adhesive film,
- an adhesive (non-PET-based) first support layer (originating from the first laminate arrangement),
- a first magnetic layer of the (annealed) ribbon comprising or made of the soft magnetic alloy (originating from the first laminate arrangement),
- an adhesive (non-PET-based) intermediate support layer (originating from the second laminate arrangement),
- a second magnetic layer of the (annealed) ribbon comprising or made of the soft magnetic alloy (originating from the second laminate arrangement),
- an adhesive (PET-based) second support layer (originating from the third adhesive tape), and
- a second PET-based adhesive film.

In addition, the sealed multi-layer flux concentrator foil may comprise a first release film on top of the second three-layer adhesive sealing laminate or the second PET-based adhesive film, respectively, and a second release film below the first three-layer adhesive sealing laminate or the first PET-based adhesive film, respectively. The first release film and second release films may originate from the sealing adhesive tapes and are to be removed prior to arranging the sealed multi-layer flux concentrator foil around at least a portion of the induction coil of the aerosol-generating device, the multi-layer flux concentrator foil is to be used in.

Preferably, the flux concentrator foil is provided as a flux concentrator tape, in particular as a continuous flux concentrator foil. Advantageously, this enables to realize the method as a reel-to-reel process.

Further features and advantages of the method according to the invention have been described with regard to the aerosol-generating device and equally apply.

The invention is defined in the claims. However, below there is provided a non-exhaustive list of non-limiting examples. Any one or more of the features of these examples may be combined with any one or more features of another example, embodiment, or aspect described herein.

Example Ex1: Aerosol-generating device for generating an aerosol by inductive heating of an aerosol-forming substrate, the device comprising:

a device housing comprising a cavity configured for removably receiving the aerosol-forming substrate to be heated;

an inductive heating arrangement comprising at least one induction coil for generating a varying magnetic field within the cavity, wherein the induction coil is arranged around at least a portion of the receiving cavity;

a flux concentrator arranged around at least a portion of the induction coil and configured to distort the varying magnetic field of the at least one inductive heating arrangement towards the cavity during use of the device, wherein the flux concentrator comprise a multi-layer flux concentrator foil having at least one magnetic layer laminated with at least a first support layer, wherein the magnetic layer comprises a plurality of separated fragments of a soft magnetic alloy.

Example Ex2: Aerosol-generating device according to example Ex1, wherein the soft magnetic alloy is a nanocrystalline soft magnetic alloy, in particular a nanocrystalline soft magnetic Fe-based alloy.

Example Ex3: Aerosol-generating article according to any one of the preceding examples, wherein the soft magnetic alloy comprises a composition of $Fe_{100-a-b-c-x-y-z}Cu_aM_bSi_xZ_z$ and up to 0.5 atom % contaminants, wherein M is one or more of the group consisting of Nb, Mo and Ta, T is one or more of the group consisting of V, Cr, Co and Ni, and Z is one or more of the group consisting of C, P and Ge, and wherein 0.5 atom %<a<1.5 atom %, 2 atom %≤b<4 atom %, 0 atom %≤c<5 atom %, 12 atom %<x<18 atom %, 5 atom %<y<12 atom % and 0 atom % z<2 atom %.

Example Ex4: Aerosol-generating article according to any one of the preceding examples, wherein the soft magnetic alloy comprises a composition of $Fe_{73.8}Nb_3Cu_1Si_{15.6}B_{6.6}$.

Example Ex5: Aerosol-generating device according to any one of the preceding examples, wherein each single fragment has a fragment size which is at most 1 millimeter, in particular at most 750 micrometer or at most 500 micrometer.

Example Ex6: Aerosol-generating device according to any one of the preceding examples, wherein the plurality of separated fragments may have a mean fragment size which is at most 1 millimeter, in particular at most 750 micrometer or at most 500 micrometer.

Example Ex7: Aerosol-generating device according to any one of the preceding examples, wherein the soft magnetic alloy has a relative maximum magnetic permeability of at least 100, in particular of at least 1000, preferably of at least 10000, even more preferably of at least 50000.

Example Ex8: Aerosol-generating device according to any one of the preceding examples, wherein the plurality of separated fragments are arranged in a pattern comprising a plurality of crack centers, wherein a plurality of cracks spread radially outwards from each crack center in a web-shaped pattern.

Example Ex9: Aerosol-generating device according to any one of the preceding examples, wherein the multi-layer flux concentrator foil comprises a plurality of adjacent magnetic layers.

Example Ex10: Aerosol-generating device according to example Ex9, wherein an adhesive film, in particular an electrically insulating adhesive film, is arranged between each pair of adjacent magnetic layers.

Example Ex11: Aerosol-generating device according to any one of the preceding examples, wherein the multi-layer flux concentrator foil comprises a second support layer on a side of the at least one magnetic layer or—if applicable—the plurality of adjacent magnetic layers opposite to the first support layer.

Example Ex12: Aerosol-generating device according to any one of the preceding examples, wherein at least one of the first support layer and—if present—the second support layer is one of an adhesive layer, an electrically insulating layer, or an electrically insulating adhesive layer.

Example Ex13: Aerosol-generating device according to any one of the preceding examples, wherein gaps between the plurality of separated fragments are at least partially filled with an electrically insulating material, in particular with at least one of material of the first support layer, or—if present—material of the second support layer, or—if present—material of the adhesive film between the adjacent magnetic layers, or with matrix material of the soft magnetic alloy.

Example Ex14: Aerosol-generating device according to any one of the preceding examples, wherein the flux concentrator foil has a thickness in a range between 0.02 millimeter and 0.25 millimeter, in particular between 0.05 millimeter and 0.2 millimeter, preferably between 0.1 millimeter and 0.15 millimeter.

Example Ex15: Aerosol-generating device according to any one of the preceding examples, wherein between the induction coil and the flux concentrator a first dielectric wrapper is arranged around at least a portion of the induction coil.

Example Ex16: Aerosol-generating device according to any one of the preceding examples, wherein an electrically conductive shielding wrapper is arranged around the flux concentrator.

Example Ex17: Aerosol-generating device according to any one of the preceding examples, wherein a second dielectric wrapper is arranged around the flux concentrator, in particular—if present—around the shielding wrapper.

Example Ex18: Aerosol-generating device according to any one of the preceding examples, further comprising at least one susceptor element arranged at least partially within the cavity.

Example Ex19: Aerosol-generating device according to example Ex18, wherein the susceptor is a tubular susceptor or a susceptor sleeve.

Example Ex20: Aerosol-generating system comprising an aerosol-generating device according to any one of the preceding examples and an aerosol-generating article received or receivable at least partially in the cavity of the device, wherein the aerosol-generating article comprises the aerosol-forming substrate to be heated.

Example Ex21: Aerosol-generating system according to example Ex20, wherein the aerosol-generating article comprises at least one susceptor positioned in thermal proximity to or thermal contact with the aerosol-forming substrate such that in use the susceptor is inductively heatable by the inductive heating arrangement when the article is received in the cavity of the device.

Example Ex22: Method for manufacturing a multi-layer flux concentrator foil of an aerosol-generating device according to any one of the preceding examples, the method comprising:

providing a multi-layer flux concentrator foil having at least one magnetic layer of a soft magnetic alloy laminated with at least a first support layer;

cracking the magnetic layer into a plurality of separated fragments by applying an external force to the flux concentrator foil transvers to the foil plane; and stretching the flux concentrator foil by pulling the flux concentrator foil under a tensile force parallel to the foil plane.

Example Ex23: Method according to example Ex22, wherein cracking the magnetic layer into a plurality of separated fragments comprises passing the flux concentrator foil through at least one pair of rollers which apply a pressure force onto the flux concentrator foil passing therethrough, wherein at least one of the rollers comprises a plurality of protrusions on its outer surface.

Example Ex24: Method according to example Ex23, wherein the respective other roller comprises a smooth outer surface, or wherein each of the rollers comprises a plurality of protrusions on its outer surface.

Example Ex25: Method according to any one of examples Ex22 to Ex25, wherein stretching the flux concentrator foil by pulling comprises pulling the flux concentrator foil under a tensile force parallel to the foil plane over at least one edge, in particular over one edge only.

Example Ex26: Method according to example Ex25, wherein pulling the flux concentrator foil over at least one edge includes pulling the flux concentrator foil over at least one sharp edge forth and back, in particular repeatedly forth and back, preferably 4 to 6 times forth and back.

Example Ex27: Method according to any one of examples Ex25 or Ex26, wherein the at least one edge comprises a rounding radius of at most 1 millimeter, in particular most 0.3 millimeter, preferably at most 0.2 millimeter, more preferably at most 0.15 millimeter. Example Ex28: Method according to any one of examples Ex22 to Ex27, wherein the tensile force is in a range between 20 N and 60 N, in particular between 25 N and 40 N, for example 30 N.

Example Ex29: Method according to any one of examples Ex22 to Ex28, further comprising pulling the flux concentrator foil under a tensile force parallel to the foil plane over at least one roller, in particular a sequence of rollers, for bending the flux concentrator foil.

Example Ex30: Method according to example Ex29, wherein the at least one roller has a radius of at most 50 millimeter, in particular at most 30 millimeter, preferably, at most 10 millimeter.

Example Ex31: Method according to any one of examples Ex29 or Ex30, wherein the tensile force is in a range between 20 N and 60 N, in particular between 25 N and 40 N, for example 30 N.

Example Ex32: Method according to any one of examples Ex22 to Ex31, wherein the flux concentrator foil is provided as a flux concentrator tape.

Example Ex33: Method according to any one of examples Ex22 to Ex32, wherein the flux concentrator foil is provided as a continuous flux concentrator foil.

Example Ex34: Method according to any one of examples Ex22 to Ex33, further comprising cutting the flux concentrator foil to a pre-determined size.

Example Ex35: Method according to example Ex34, further comprising sealing one or more cut edges of the flux concentrator foil cut to size.

Example Ex36: Method according to examples Ex22 to Ex35, wherein the method is realized as a reel-to-reel process.

Examples will now be further described with reference to the figures in which.

Figure 1:
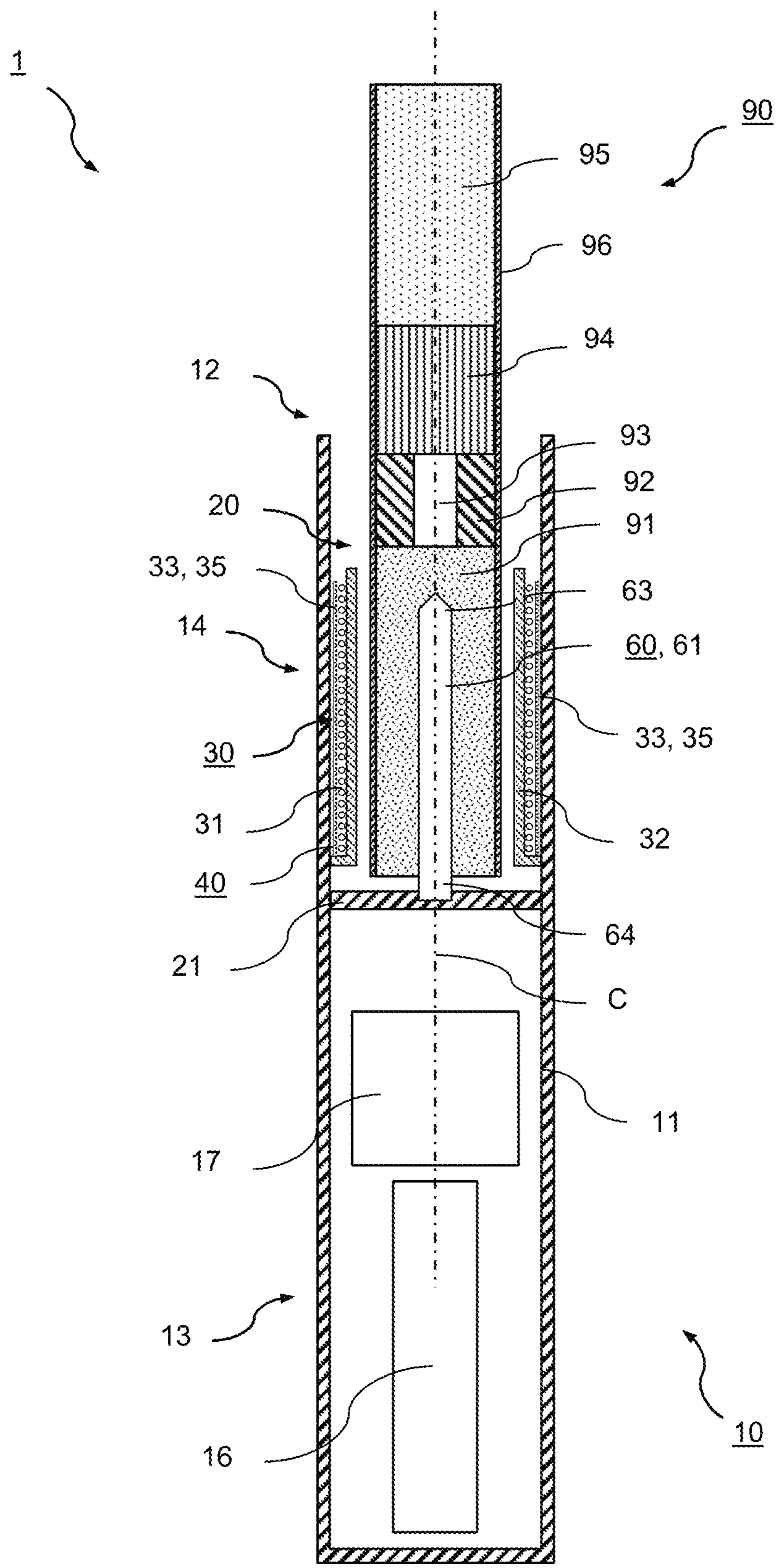
FIG. 1 shows a schematic longitudinal cross-section of an aerosol-generating system in accordance with a first embodiment the present invention.
Figure 3:
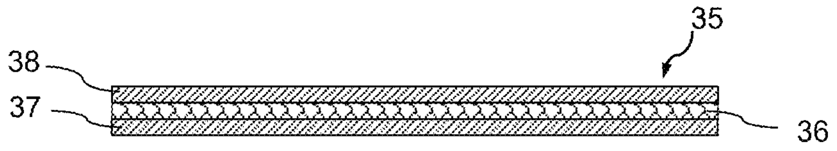
Figure 4A:
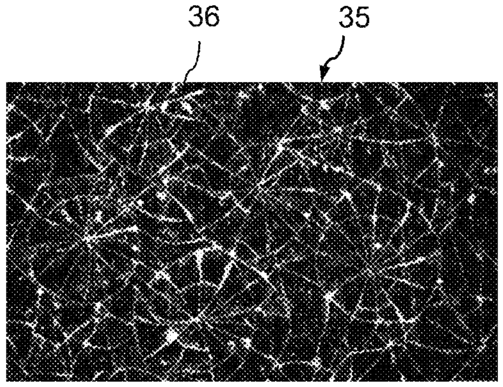
Figure 4B:
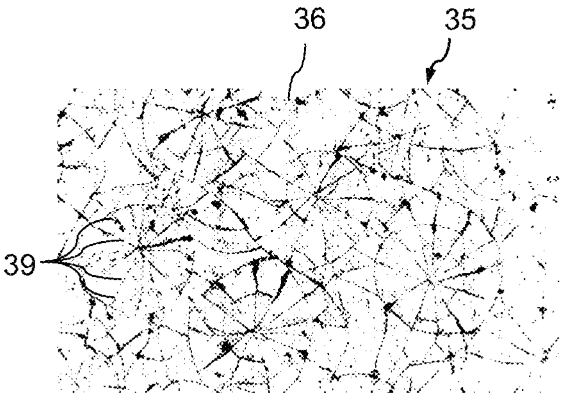
Figure 9:
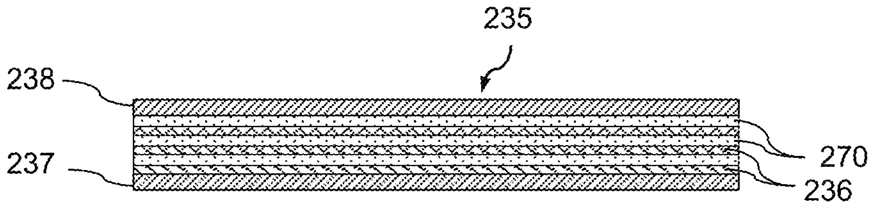

FIGS. 3, 4*a*-4*b* show details of the multi-layer flux concentrator foil used in the device according to FIG. 1;

FIGS. 5-8 show different arrangements of a flux concentrator foil according to the present invention;

FIG. 9 schematically illustrates an exemplary embodiment of a multi-layer flux concentrator foil comprising a plurality of magnetic layers.

Figure 10:
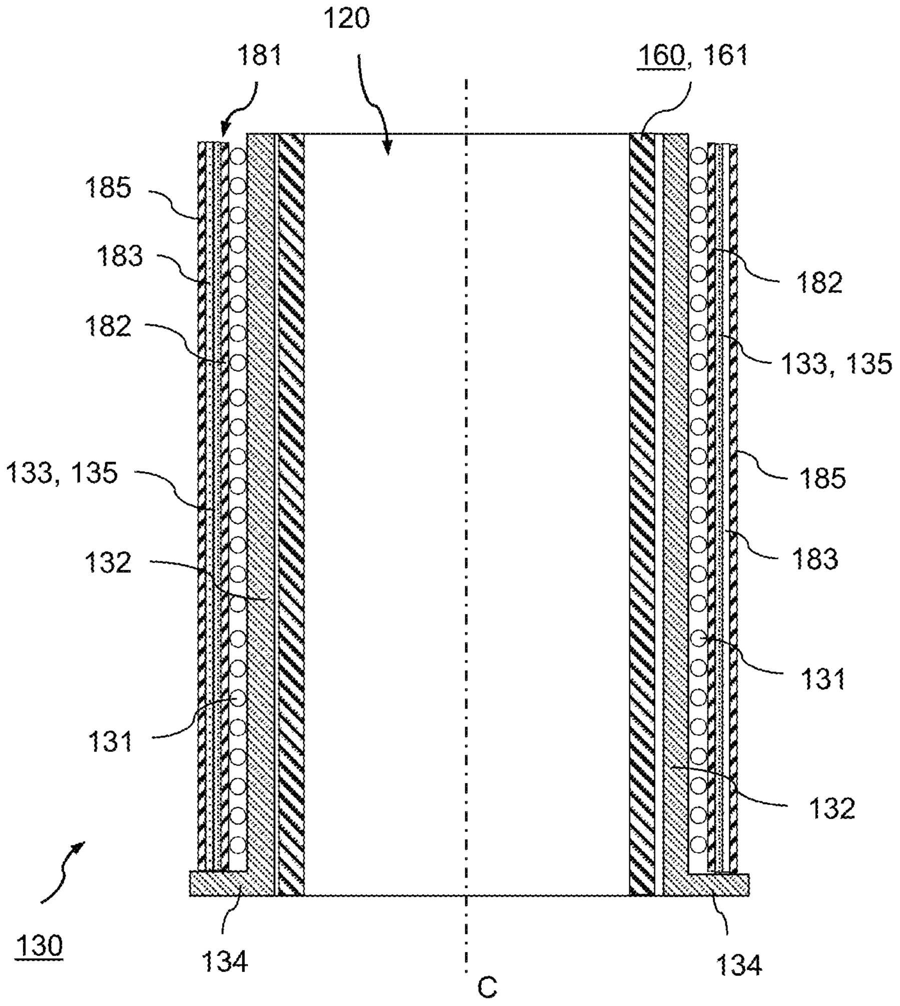
Figure 11:
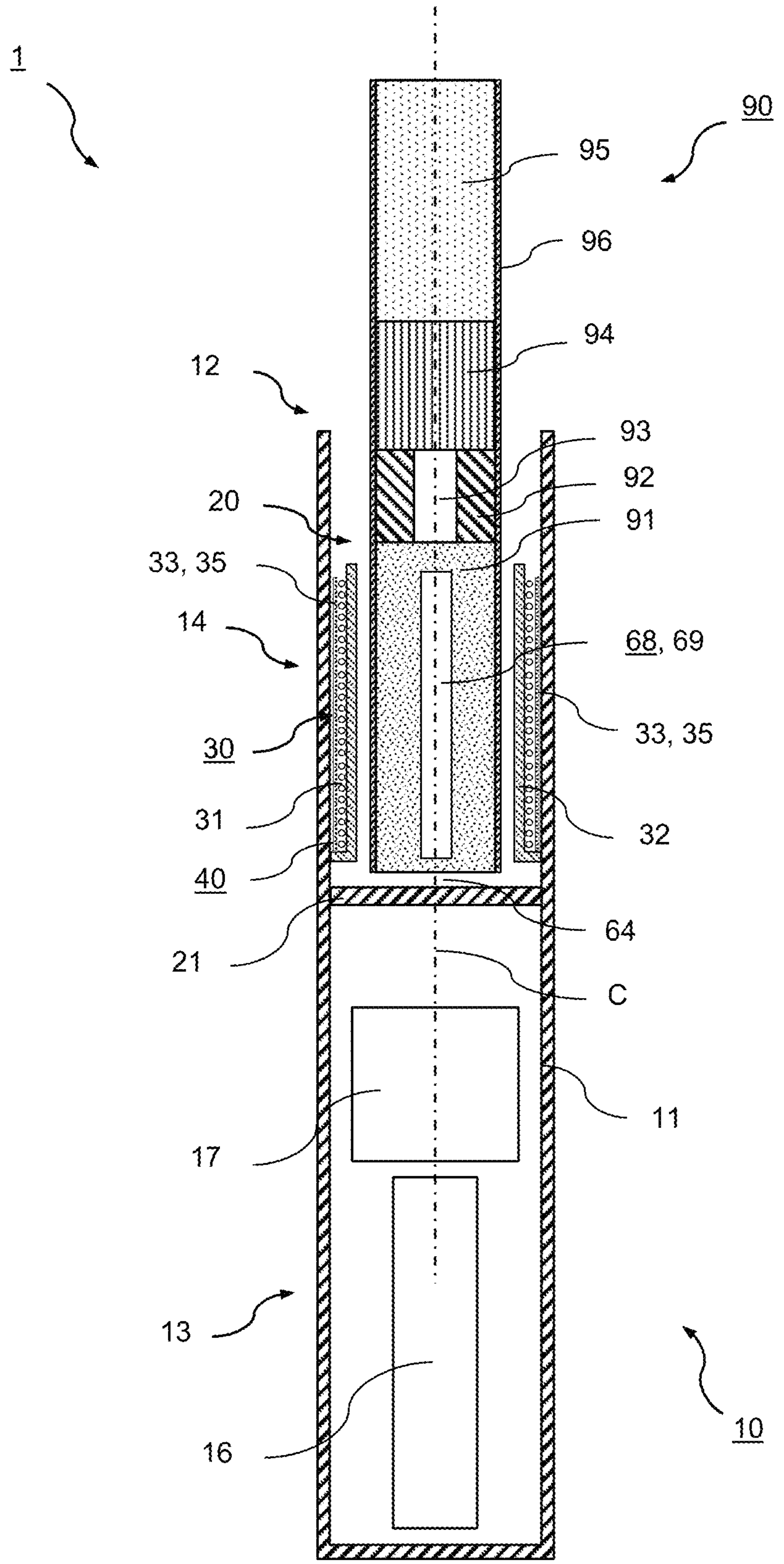
Figure 16:
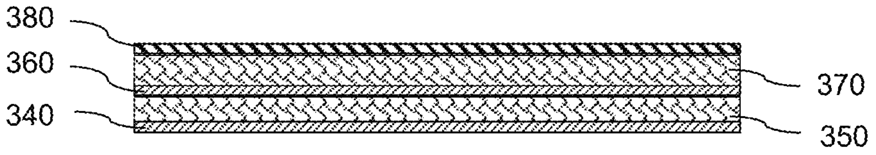
Figure 17:
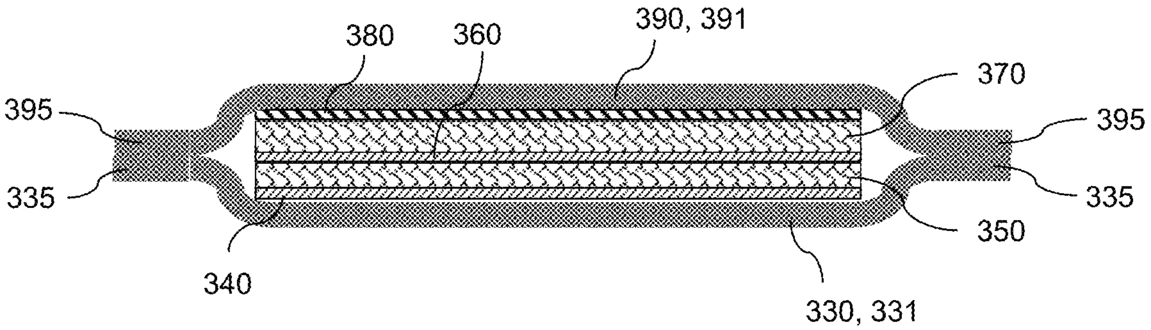

FIG. 10 is a detail view of an induction module according to a second embodiment the present invention;

FIG. 11 shows a schematic longitudinal cross-section of an aerosol-generating system in accordance with another embodiment the present invention;

FIGS. 12-15 exemplarily illustrate various steps of the method according to the present invention;

FIG. 16 shows details of another example of a multi-layer flux concentrator foil which can be used in the device according to FIG. 1 and which comprises a plurality of magnetic layers; and FIG. 17 shows the multi-layer flux concentrator foil according to FIG. 16 being sealed by a sealing adhesive tape.

FIG. 1 shows a schematic cross-sectional illustration of a first exemplary embodiment of an aerosol-generating system 1 according to the present invention. The system 1 is configured for generating an aerosol by inductively heating an aerosol-forming substrate 91. The system 1 comprises two main components: an aerosol-generating article 90 including the aerosol-forming substrate 91 to be heated, and an aerosol-generating device 10 for use with the article 90. The device 10 comprises a receiving cavity 20 for receiving the article 90, and an inductive heating arrangement for heating the substrate 91 within the article 90 when the article 90 is inserted into the cavity 20.

The article 90 has a rod shape resembling the shape of a conventional cigarette. In the present embodiment, the article 90 comprises four elements arranged in coaxial alignment: a substrate element 91, a support element 92, an aerosol-cooling element 94, and a filter plug 95. The substrate element is arranged at a distal end of the article 90 and comprises the aerosol-forming substrate to be heated. The aerosol-forming substrate 91 may include, for example, a crimped sheet of homogenized tobacco material including glycerin as an aerosol-former. The support element 92 comprises a hollow core forming a central air passage 93. The filter plug 95 serves as a mouthpiece and may include, for example, cellulose acetate fibers. All four elements are substantially cylindrical elements being arranged sequentially one after the other. The elements substantially have the same diameter and are circumscribed by an outer wrapper 96 made of cigarette paper such as to form a cylindrical rod. The outer wrapper 96 may be wrapped around the aforementioned elements so that free ends of the wrapper overlap each other. The wrapper may further comprise adhesive that adheres the overlapped free ends of the wrapper to each other.

The device 10 comprises a substantially rod-shaped main body 11 formed by a substantially cylindrical device housing. Within a distal portion 13, the device 10 comprises a power supply 16, for example a lithium ion battery, and an electric circuitry 17 including a controller for controlling operation of the device 10, in particular for controlling the heating process. Within a proximal portion 14 opposite to the distal portion 13, the device 10 comprises the receiving cavity 20. The cavity 20 is open at the proximal end 12 of device 10, thus allowing the article 90 to be readily inserted into the receiving cavity 20.

A bottom portion 21 of the receiving cavity separates the distal portion 13 of the device 10 from the proximal portion

14 of the device 10, in particular from the receiving cavity 20. Preferably, the bottom portion is made of a thermally insulating material, for example, PEEK (polyether ether ketone). Thus, electric components within the distal portion 13 may be kept separate from aerosol or residues produced by the aerosol generating process within the cavity 20.

The inductive heating arrangement of the device 10 comprises an induction source including an induction coil 31 for generating an alternating, in particular high-frequency varying magnetic field. In the present embodiment, the induction coil 31 is a helical coil circumferentially surrounding the cylindrical receiving cavity 20. The induction coil 31 is formed from a wire and has a plurality of turns, or windings, extending along the length extension of the cavity 20. The wire may have any suitable cross-sectional shape, such as square, oval, or triangular. In this embodiment, the wire has a circular cross-section. In other embodiments, the wire may have a flat cross-sectional shape.

The inductive heating arrangement further comprises a susceptor element 60 that is arranged within the receiving cavity 20 such as to experience the varying magnetic field generated by the induction coil 31. In the present embodiment, the susceptor element 60 is a susceptor blade 61. With its distal end 64, the susceptor blade is arranged at the bottom portion 21 of the receiving cavity 20 of the device. From there, the susceptor blade 61 extends into the inner void of the receiving cavity 20 towards the opening of the receiving cavity 20 at the proximal end 12 of the device 10. The other end of the susceptor blade 60, that is, the distal free end 63 is tapered enabling the susceptor blade to penetrate the aerosol-forming substrate 91 within the distal end portion of the article 90.

When the device 10 is actuated, a high-frequency alternating current is passed through the induction coil 31. This causes the coil 31 to generate a varying magnetic field within the cavity 20. As a consequence, the susceptor blade 61 heats up due to eddy currents and/or hysteresis losses, depending on the magnetic and electric properties of the materials of the susceptor element 60. The susceptor 60 in turn heats the aerosol-forming substrate 91 of the article 90 to a temperature sufficient to form an aerosol. The aerosol may be drawn downstream through the aerosol-generating article 90 for inhalation by the user.

The high-frequency varying magnetic field may be in the range between 500 kHz (kilo-Hertz) to 30 MHz (Mega-Hertz), in particular between 5 MHz (Mega-Hertz) to 15 MHz (Mega-Hertz), preferably between 5 MHz (Mega-Hertz) and 10 MHz (Mega-Hertz).

In the present embodiment, the induction coil 31 is part of an induction module 30 that is arranged with the proximal portion 14 of the aerosol-generating device 10. The induction module 30 has a substantially cylindrical shape that is coaxially aligned with a longitudinal center axis C of the substantially rod-shaped device 10. As can be seen from FIG. 1, the induction module 30 forms a least a portion of the cavity 20 or at least a portion of an inner surface of the cavity 20.

Figure 2:
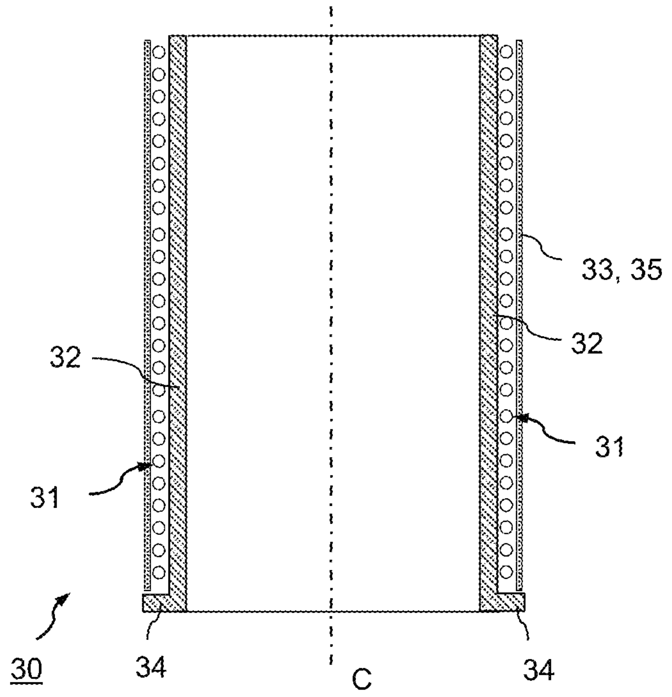
FIG. 2 is a detail view of the induction module according to FIG. 1.

FIG. 2 shows the induction module 30 in more detail. Besides the induction coil 31, the induction module 30 comprises a tubular inner support sleeve 32 which carries the helically wound, cylindrical induction coil 31. At one end, the tubular inner support sleeve 32 has an annular protrusion 34 extending around the circumference of the inner support sleeve 32 to retain the coil 31 in position on the inner support sleeve 32. The inner support sleeve 32 may be made from any suitable material, such as a plastic. In particular, the inner support sleeve 32 may be a least a portion of the cavity 20, that is, at least a portion of an inner surface of the cavity 20.

Both the induction coil 31 and the inner support sleeve 32 (apart from the protrusion 34) are surrounded by a tubular flux concentrator 33 which extends along the length of the induction coil 3, which may be in the range of 16 millimeter to 18 millimeter. The flux concentrator 33 is configured to distort the varying magnetic field generated by the induction coil 31 during use of the device 10 towards the cavity 20. Basically, the flux concentrator 33 acts as a magnetic shield in order to reduce undesired heating of or interference with external objects. In addition, the flux concentrator 33 courses the magnetic field lines within the inner volume of the induction module 30 to be distorted so that the density of the magnetic field within the cavity 20 is increased. This may increase the current generated within the susceptor blade 61 located in the cavity 20. In this manner, the electromagnetic field can be concentrated towards the cavity 20 to allow for more efficient heating of the susceptor element 60.

According to the invention, the flux concentrator 33 is made of a multi-layer flux concentrator foil 35. FIG. 3 (not to scale) and FIG. 4*a*-4*b* show a respective portion of the multi-layer flux concentrator foil 35 in more detail. FIG. 3 is a cross-sectional view through the multi-layer flux concentrator foil 35. FIG. 4*a* is a black-white photograph of a portion of a specimen of the magnetic layer 36. FIG. 4*b* shows the magnetic layer 36 according to FIG. 4*a* with inverted colors in order to enhance the visibility of the cracks and fragments 39. As shown in FIG. 3, the multi-layer flux concentrator foil 35 according to the present invention comprises three layers, namely, a magnetic layer 36 of a soft magnetic alloy, a first support layer 37 and a second support layer 36, wherein the magnetic layer 36 is laminated between the first support layer 37 and the second support layer 38. According to the invention, the magnetic layer 36 comprises a plurality of separated fragments 39. Due to the fragmentation, the formation of eddy currents in the magnetic layer 36 is partially inhibited as the flake-like fragments 39 are separated from each other and as every single fragment 39 thus provides only limited space for eddy currents to form up. Hence, as compared to a non-fragmented magnetic layer, the fragmented magnetic layer 36 has a reduced AC resistance. As a result, when exposed to a varying magnetic field, there is no or only little energy dissipation in the fragments 39 causing the flux concentrator foil 35 as a whole to heat up only slightly, if at all. Hence, the vast majority of the energy provided by the varying magnetic field can be dissipated in the susceptor. As shown in FIG. 4*a*-4*b*, the plurality of separated fragments 39 may be arranged in a pattern comprising a plurality of crack centers, wherein a plurality of cracks spread radially outwards from each crack center in a web-shaped pattern. As can be seen, the separated fragments each have different fragment sizes. A mean fragment size may be at most 1 millimeter, in particular at most 500 micrometer.

Preferably, the soft magnetic alloy is a nanocrystalline soft magnetic alloy, for example, made of Vitroperm 800. Vitroperm 800 has a maximum relative magnetic permeability of more than 20.0000 at a magnetic field frequency of 50 Hertz. Accordingly, this material is particularly suited to concentrate and guide the magnetic field generated by an induction coil. Furthermore, Vitroperm 800 is rather brittle and thus easy to crack into a plurality fragments.

The first support layer 37 and the second support layer 38 basically serve to protect the brittle magnetic layer 36, in particular to prevent the fragmented magnetic layer 36 to crumble away by bonding the fragments 39 of the magnetic layer 36 in a laminate structure. For that purpose, the first support layer 37 and the second support layer 38 preferably are adhesive layers. For example, the first and second support layers 37, 38 may be made of transparent glue or plastic tape. Preferably, the material of the first and second support layer 37, 38 is electrically insulating in order to prevent short-circuiting of the separated fragments 39.

In the present embodiment, the magnetic layer 36 may have a layer thickness of 20 micrometer. The first support layer 37 and the second support layer 38 may each have a layer thickness of 22 micrometer. Accordingly, the flux concentrator for 35 as a whole may have a thickness of 64 micrometer.

Figure 5:
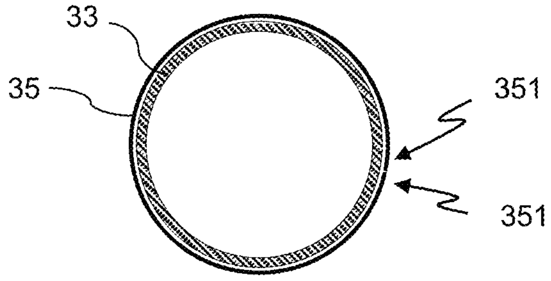
Figure 6:
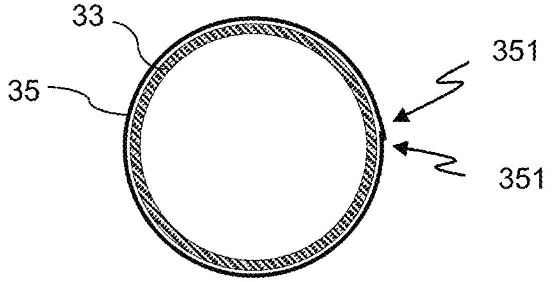
Figure 7:
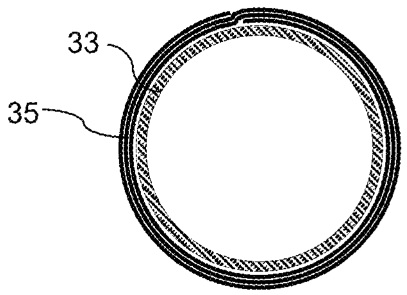
Figure 8:
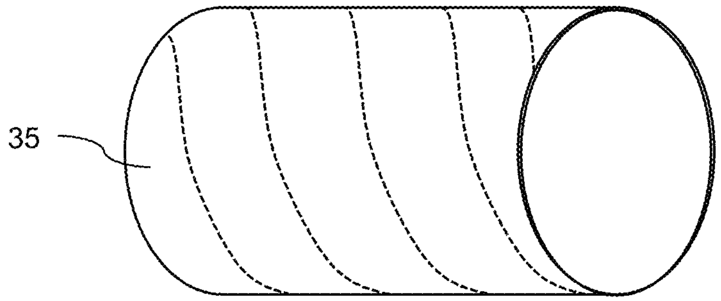

In the embodiment shown in FIG. 1 and FIG. 2, the flux concentrator for 35 is wound up in a single winding such as to form a tubular flux concentrator or a flux concentrator sleeve which comprises a single winding of the flux concentrator foil 35 surrounding the induction coil 31. In principle, the flux concentrator foil 35 may be wound up in different ways around the induction coil 31. According to a first embodiment, the flux concentrator foil 35 may be wound up with its free ends 351 abutting against each other as shown in FIG. 5. That is, the longitudinal edges of the flux concentrator foils 35 which extend along the length axis of C of the aerosol-generating device 10 abut against each other. According to a second embodiment, the flux concentrator foil 35 may be wound up with free ends 351 overlapping each other as shown in FIG. 6. That is, the longitudinal edges of the flux concentrator foil 35 which extend along the length axis of C of the aerosol-generating device 10 abut against each other. According to a third embodiment as shown in FIG. 7, the flux concentrator foil 35 may be wound up in multiple windings such as to form a tubular flux concentrator or a flux concentrator sleeve comprising multiple, in particular spiral windings of a flux concentrator foil overlapping each other. According to a fourth embodiment as shown in FIG. 8, the flux concentrator foil 35, 13 may also be wound up helically in an axially direction with respect to winding axis, that is, along the length axis of C of the aerosol-generating device, such as to form a tubular flux concentrator or a flux concentrator sleeve comprising one or more helical windings of a flux concentrator foil 35, 135.

FIG. 9 shows a second embodiment of the multi-layer flux concentrator foil 235. As compared to the embodiment shown in FIG. 2 and FIG. 3, the multi-layer flux concentrator foil 235 according to FIG. 9 comprises a plurality of magnetic layers 236 laminated between a first support layer 237 and a second support layer 238. In addition, an electrically insulating adhesive film 270 is arranged between each pair of adjacent magnetic layers 236. In particular with regard to the multiple-winding configuration shown in FIG. 7 and FIG. 8, the plurality of magnetic layers 236 may limit the number of turns necessary to be wound up. Advantageously, this may simplify the manufacturing of the flux concentrator.

Again with reference to FIG. 1 and FIG. 2, the flux concentrator foil 35 is directly wrapped around the induction coil 31 substantially without any radial spacing between the induction coil 31 and the flux concentrator foil 35.

FIG. 10 shows another embodiment of the induction module 130, in which the flux concentrator foil 135 is radially spaced apart from the induction coil 131. That is, the aerosol-generating device comprises a radial gap 181 between the induction coil 131 and the flux concentrator foil 135. In the present embodiment, the gap 181 is filled with a first dielectric wrapper 182. For example, the induction coil 131 may be wrapped by one or more layers of Kapton tape 182 such as to fill the radial gap 181 between the induction coil 131 and the flux concentrator 133. The gap 181 or the first dielectric wrapper 182, respectively, may have a radial extension in a range between 40 micrometers and 240 micrometers, for example 80 micrometers. Advantageously, the gap 181 may help to reduce losses in the induction coil and to increase losses in the susceptor to be heated, that is, to increase the heating efficiency of the aerosol-generating device. Alternatively, the gap may be an air gap. Furthermore, the induction module 130 according to FIG. 10 comprises an electrically conductive shielding wrapper 183 that is arranged around the flux concentrator in order to provide an additional shielding of the outer portions of the device by electrically closing the field loop. For example, the conductive shielding wrapper 180 may be an aluminum foil that is wound in one or more turns around the flux concentrator 135. In addition to that, the induction module 130 comprises a second dielectric wrapper 185 made of a Kapton tape that is arranged around the flux concentrator 135 and the shielding wrapper 183 for protecting the flux concentrator 135 and the shielding wrapper 183. Further in contrast to the embodiment shown in FIG. 1 and FIG. 2, the susceptor element 160 according to the embodiment shown in FIG. 10 is a susceptor sleeve 161 which is arranged at the inner surface of the inner support sleeve 132 such as to surround the article when the article is received in the receiving cavity. Apart from that, the embodiment shown in FIG. 10 is very similar to the embodiment shown in FIG. 1 and FIG. 2. Therefore, identical or similar features are denoted with the same reference signs, however, incremented by 100.

FIG. 11 shows a schematic cross-sectional illustration of yet another embodiment of an aerosol-generating system 1 according of the present invention. The system is identical to the system shown in FIG. 1, apart from the susceptor. Therefore, identical reference numbers are used for identical features. In contrast to the embodiment shown in FIG. 1, the susceptor 68 of the system according to FIG. 11 is not part of the aerosol-generating device 10 but part of the aerosol-generating article 90. In the present embodiment, the susceptor 68 comprises a susceptor strip 69 made of metal, for example, stainless steel, which is located within the aerosol-forming substrate of the substrate element 91. In particular, the susceptor 68 is arranged within the article 90 such that upon insertion of the article 90 into the cavity 20 of the device 10, the susceptor strip 69 is arranged the cavity 20, in particular within the induction coil 31 such that in use the susceptor strip 69 experience the magnetic field of the induction coil 31.

Figure 12:
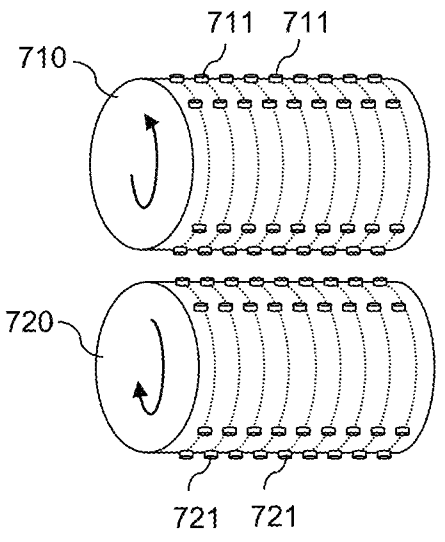
Figure 13:
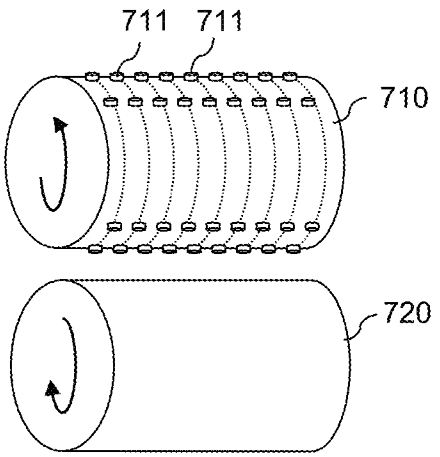

FIGS. 12-15 exemplarily illustrate some steps of the method according to the present invention that is used for manufacturing a multi-layer flux concentrator foil of an aerosol-generating device according to the present invention. As described further above, the method comprises—inter alia—the step of cracking the one or more magnetic layers of the multi-layer flux concentrator foil into a plurality of fragments by applying an external force to the flux concentrator foil transvers to the foil plane. This may be accomplished by passing the flux concentrator foil through at least one pair of counter-rotating rollers 710, 720 which are pressed against each other such that the foil passing therethrough is squeezed between the two rollers 710, 720. As shown in FIG. 12 and FIG. 13, at least one of the rollers 710 comprises a plurality of protrusions 711 on its outer surface each of which locally applies a force to the flux concentrator foil transvers to the foil plane. In FIG. 12, each one of the upper roller 710 and the lower roller 720 comprises a plurality of protrusions 711, 721 in order to enhance the cracking effect. Preferably, the plurality of protrusions 711, 721 on both rollers 710, 720 may be formed as complementary protrusions. For example, in operation, the protrusions 711 of the upper roller 710 may fit in between the protrusions 721 of the lower roller 720. In contrast, as shown in FIG. 13, it is also possible that only one of the rollers 710 comprises a plurality of protrusions 711, whereas the respective other roller 720 comprises a smooth outer surface acting as a counter surface for the protrusions 711. It is to be noted that for reasons of simplicity FIG. 12 and FIG. 13 only show four rows of prosecutions 711, 721 on the respective rollers 710, 720. However, the rollers preferably have more than four rows of prosecutions equally distributed around the circumference of the respective roller.

Figure 14:
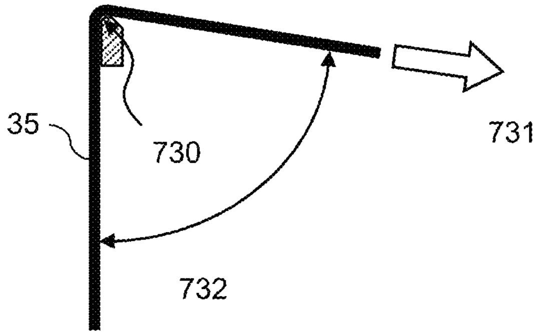

The method further comprises the step of pulling the flux concentrator foil 35 under a tensile force parallel to the foil plane over at least one edge 730. This is shown in FIG. 14, in which arrow 731 indicates the tensile force. This step causes the fragments to be cracked in even smaller fragments and—most importantly—to be pulled apart such as to be further separated from each other. Advantageously, this results in an enhanced reduction of the AC resistance of the magnetic layer and, thus, in an enhanced reduction of the eddy current losses in the magnetic layer of the flux concentrator foil. Preferably, the least one edge 730 comprises a rounding radius of at most 0.3 millimeter, in particular at most 0.2 millimeter, preferably, at most 0.15 millimeter. Pulling the foil 35 over the edge 730 may occur under an angle 732 in a range between 60 degrees and 120 degrees, for example 80 degrees as shown in FIG. 14. The tensile force 731 used for pulling the foil 35 over the edge 730 may be in a range between 20 N and 60 N, in particular between 25 N and 40 N, for example 30 N.

Figure 15:
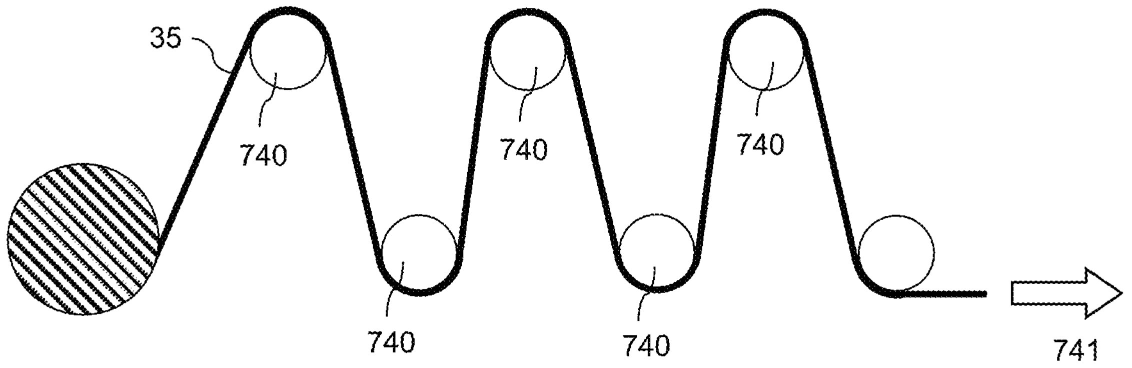

In addition, the method may comprise pulling the flux concentrator foil under a tensile force 741 parallel to the foil plane over a sequence of rollers 740 in order to bend the flux concentrator foil 35 as shown in FIG. 15. Advantageously, this step may cause the fragments to be cracked in even smaller fragments, thus resulting in an enhanced reduction of the AC resistance of the magnetic layer. This step may be performed prior to pulling the flux concentrator foil over the at least one edge.

FIG. 16 shows (not to scale) another example of a multi-layer flux concentrator foil according to the present invention, which comprises a plurality of magnetic layers. From bottom to top, the multi-layer flux concentrator foil according to FIG. 16 comprises the following layers:

- an adhesive (non-PET) first support layer 340,
- a first magnetic layer 350 comprising or made of the soft magnetic alloy,
- an adhesive (non-PET) intermediate support layer 360,
- a second magnetic layer comprising or made of the soft magnetic alloy 370, and
- an adhesive (PET-based) second support layer 380.

As has been described in more detail above, the multi-layer flux concentrator foil may be sealed to prevent fragments from laterally escaping from the foil. For this, a sealing adhesive tape 330, 390 may be arranged on one or each side of the (unsealed) flux concentrator foil according to FIG. 16. Such a sealed multi-layer flux concentrator foil is shown in FIG. 17. As can be seen there, the adhesive sealing tape 330, 390 has a width extension in a direction transverse to opposite edges of the unsealed flux concentrator foil which is larger than a width extension of the unsealed flux concentrator foil in the same direction, that is, in a direction transverse to opposite edges of the unsealed flux concentrator foil. As a result, the sealing adhesive tape 330, 390 on each side of the unsealed flux concentrator foil comprises laterally protruding wings 335, 395, which may get into adhesive contact with each other such as to seal the edges of the (unsealed) flux concentrator. Accordingly, the specific example of the sealed multi-layer flux concentrator foil according to FIG. 17 comprises the following layers (from bottom to top):

- a first PET-based adhesive film 331 (first adhesive sealing tape 330),
- an adhesive (non-PET) first support layer 340,
- a first magnetic layer 350 comprising or made of the soft magnetic alloy,
- an adhesive (non-PET) intermediate support layer 360,
- a second magnetic layer comprising or made of the soft magnetic alloy 370,
- an adhesive (PET-based) second support layer 380, and
- a second PET-based adhesive film 391 (second adhesive sealing tape 390).

The first and second PET-based adhesive films 331, 391 may have a thickness of 2-5 micrometer, in particular 3 micrometer. The adhesive (non-PET-based) first and second support layer 340, 360 and the adhesive (PET-based) third support 380 layer may have a thickness in a range between 2 micrometer and 10 micrometer, in particular in range between 2 micrometer and 5 micrometer, for example, 3 micrometer. The first and second magnetic layers 350, 370 may have a thickness in range between 15 micrometer and 25 micrometer, in particular in range between 18 micrometer and 23 micrometer, for example, 21 micrometer.

Instead of the first and second PET-based adhesive films 331, 991, the first and second sealing tape 330, 390 may also comprise a first and second three-layer adhesive sealing laminate, each of comprises a (PEN- or PI-based) film sandwiched between a first adhesive layer and a second adhesive layer (not shown in FIG. 17).

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number A is understood as A±5 percent A. Within this context, a number A may be considered to include numerical values that are within general standard error for the measurement of the property that the number A modifies. The number A, in some instances as used in the appended claims, may deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. An aerosol-generating device for generating an aerosol by inductive heating of an aerosol-forming substrate, the aerosol-generating device comprising:

- a device housing comprising a cavity configured to removably receive the aerosol-forming substrate to be heated;
- an inductive heating arrangement comprising at least one induction coil configured to generate a varying magnetic field within the cavity, wherein the at least one induction coil is arranged around at least a portion of the cavity; and a flux concentrator arranged around at least a portion of the induction coil and being configured to distort the varying magnetic field of the inductive heating arrangement towards the cavity, wherein the flux concentrator comprises a multi-layer flux concentrator foil having at least one magnetic layer laminated with at least a first support layer, wherein the magnetic layer comprises a plurality of separated fragments of a soft magnetic alloy, wherein the plurality of separated fragments are arranged in a pattern comprising a plurality of crack centers, and wherein a plurality of cracks spread radially outwards from each crack center in a web-shaped pattern.

2. The aerosol-generating device according to claim 1, wherein the soft magnetic alloy is a metallic glass or a nanocrystalline soft magnetic Fe-based alloy.

3. The aerosol-generating device according to claim 1, wherein the soft magnetic alloy comprises a composition of $Fe_{100-a-b-c-x-y-z}Cu_aM_bT_cSi_xZ_z$ and up to 0.5 atom % contaminants, wherein M is one or more of the group consisting of Nb, Mo, and Ta, T is one or more of the group consisting of V, Cr, Co, and Ni, and Z is one or more of the group consisting of C, P, and Ge, and wherein 0.5 atom %<a<1.5 atom %, 2 atom %≤b<4 atom %, 0 atom %≤c<5 atom %, 12 atom %<x<18 atom %, 5 atom %<y<12 atom %, and 0 atom %≤z<2 atom %.

4. The aerosol-generating device according to claim 1, wherein the multi-layer flux concentrator foil comprises a plurality of adjacent magnetic layers.

5. The aerosol-generating device according to claim 4, wherein the multi-layer flux concentrator foil comprises a second support layer on a side of the at least one magnetic layer or the plurality of adjacent magnetic layers opposite to the first support layer.

6. The aerosol-generating device according to claim 5, wherein at least one of the first support layer and the second support layer is one of an adhesive layer, an electrically insulating layer, or an electrically insulating adhesive layer.

7. The aerosol-generating device according to claim 1, wherein gaps between the plurality of separated fragments are at least partially filled with an electrically insulating material.

8. The aerosol-generating device according to claim 5, wherein gaps between the plurality of separated fragments are at least partially filled with at least one of material of the first support layer, or material of the second support layer, or material of an adhesive film between the adjacent magnetic layers, or with matrix material of the soft magnetic alloy.

9. The aerosol-generating device according to claim 1, wherein between the induction coil and the flux concentrator a first dielectric wrapper is arranged around at least a portion of the induction coil.

10. A method for manufacturing a multi-layer flux concentrator foil of an aerosol-generating device according to claim 1, the method comprising:

providing a multi-layer flux concentrator foil having at least one magnetic layer of a soft magnetic alloy laminated with at least a first support layer;

cracking the magnetic layer into a plurality of separated fragments by applying an external force to the flux concentrator foil transverse to a foil plane; and stretching the flux concentrator foil by pulling the flux concentrator foil under a tensile force parallel to the foil plane.

11. The method according to claim 10, wherein the cracking the magnetic layer into a plurality of separated fragments comprises passing the flux concentrator foil through at least one pair of rollers, which apply a pressure force onto the flux concentrator foil passing therethrough, wherein at least one of the rollers comprises a plurality of protrusions on an outer surface thereof.

12. The method according to claim 11, wherein the respective other roller comprises a smooth outer surface, or wherein each of the rollers comprises a plurality of protrusions on an outer surface thereof.

13. The method according to claim 10, wherein the pulling the flux concentrator foil comprises pulling the flux concentrator foil under a tensile force parallel to the foil plane over at least one edge, in particular over one edge only.

14. The method according to claim 10, wherein the pulling the flux concentrator foil comprises pulling the flux concentrator foil under a tensile force parallel to the foil plane over one edge only.

15. The method according to claim 10, further comprising pulling the flux concentrator foil under a tensile force parallel to the foil plane over at least one roller for bending the flux concentrator foil.

16. The method according to claim 10, further comprising pulling the flux concentrator foil under a tensile force parallel to the foil plane over a sequence of rollers for bending the flux concentrator foil.

17. The method according to claim 10, further comprising cutting the flux concentrator foil to a predetermined size.

18. The method according to claim 17, further comprising sealing one or more cut edges of the flux concentrator foil cut to size.

* * * * *